(12) United States Patent
Tanaka et al.

(10) Patent No.: US 8,412,047 B2
(45) Date of Patent: Apr. 2, 2013

(54) POLARIZATION MULTIPLEXED LIGHT TRANSMITTER AND CONTROL METHOD THEREOF

(75) Inventors: Toshiki Tanaka, Kawasaki (JP); Yuichi Akiyama, Kawasaki (JP); Masahiro Yuki, Kawasaki (JP); Hideyuki Miyata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 523 days.

(21) Appl. No.: 12/585,156

(22) Filed: Sep. 4, 2009

(65) Prior Publication Data
US 2010/0067914 A1    Mar. 18, 2010

(30) Foreign Application Priority Data
Sep. 10, 2008 (JP) .................. 2008-232413

(51) Int. Cl.
H04J 14/06 (2006.01)
H04J 14/00 (2006.01)
H04B 10/00 (2006.01)
G02F 1/00 (2006.01)
G02B 6/00 (2006.01)

(52) U.S. Cl. .............. 398/102; 398/98; 398/43; 398/65; 398/182; 398/183; 398/184

(58) Field of Classification Search .............. 398/65, 398/43
See application file for complete search history.

(56) References Cited

U.S. PATENT DOCUMENTS

| | | | |
|---|---|---|---|
| 2003/0067667 A1* | 4/2003 | Wang et al. | 359/323 |
| 2005/0213975 A1 | 9/2005 | Gottwald et al. | |
| 2007/0065161 A1* | 3/2007 | Miura et al. | 398/186 |
| 2007/0166046 A1* | 7/2007 | Hecker et al. | 398/154 |
| 2007/0264028 A1* | 11/2007 | Yuki et al. | 398/183 |
| 2009/0274469 A1 | 11/2009 | Yuki et al. | |

FOREIGN PATENT DOCUMENTS

| | | |
|---|---|---|
| EP | 1 681 542 | 7/2006 |
| JP | 2002-344426 | 11/2002 |
| JP | 2009-272694 | 11/2009 |

OTHER PUBLICATIONS

Patent Abstracts of Japan, Publication No. 2002-344426, Published Nov. 29, 2002.

(Continued)

*Primary Examiner* — Shi K Li
*Assistant Examiner* — Oommen Jacob
(74) *Attorney, Agent, or Firm* — Staas & Halsey LLP

(57) ABSTRACT

The polarization multiplexed light transmitter takes out a part of a polarization multiplexed light to be transmitted as a monitor light; makes orthogonal polarization components contained in the monitor light to interfere with each other, to generate a polarization interfering light; converts the polarization interfering light into an electric signal; measures the power of an alternate current component contained in the electric signal after eliminating a direct current component thereof; and feedback controls delay amount varying sections so that an inter-polarized channel delay time judged based on a change in the measured power reaches a predetermined value. Thus, the delay time between the orthogonal polarization components in the polarization multiplexed light can be varied flexibly at a high speed with a simple configuration, and thus, it becomes possible to suppress transmission characteristics degradation of the polarization multiplexed light due to a change in system state.

7 Claims, 28 Drawing Sheets

OTHER PUBLICATIONS

D. van den Borne, et al., "1.66b/s/Hz Spectrally Efficient Transmission Over 1700km of SSMF Using 40×85.6-Gb/s POLMUX-RZ-DQPSK", Journal of Lightwave Technology, vol. 25, No. 1, Jan. 2007, pp. 222-232,.

D. van den Borne, et al., "1.6-b/s/Hz Spectrally Efficient Transmission Over 1700km of SSMF Using 40×85.6-Gb/s POLMUX-RZ-DQPSK", Journal of Lightwave Technology, vol. 25, No. 1, Jan. 2007, pp. 222-232,.

European Search Report dated Mar. 26, 2012 in Application No. 09169702.9.

European Office Action issued Oct. 18, 2012 in corresponding European Patent Application No. 09169702.9.

* cited by examiner

FIG.8
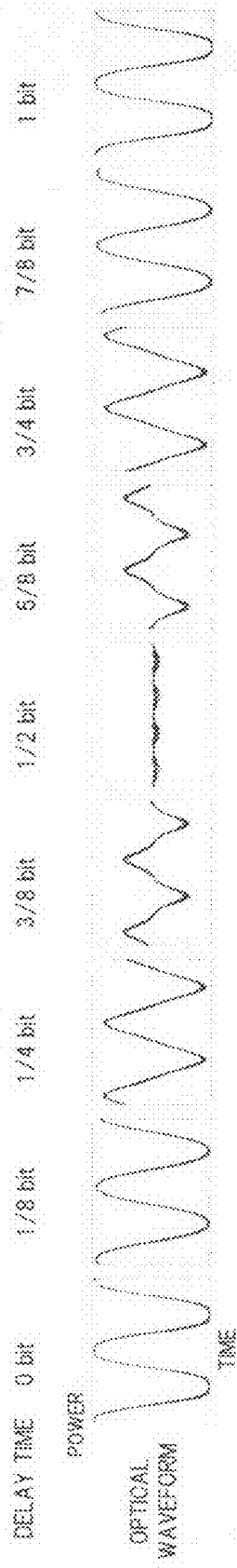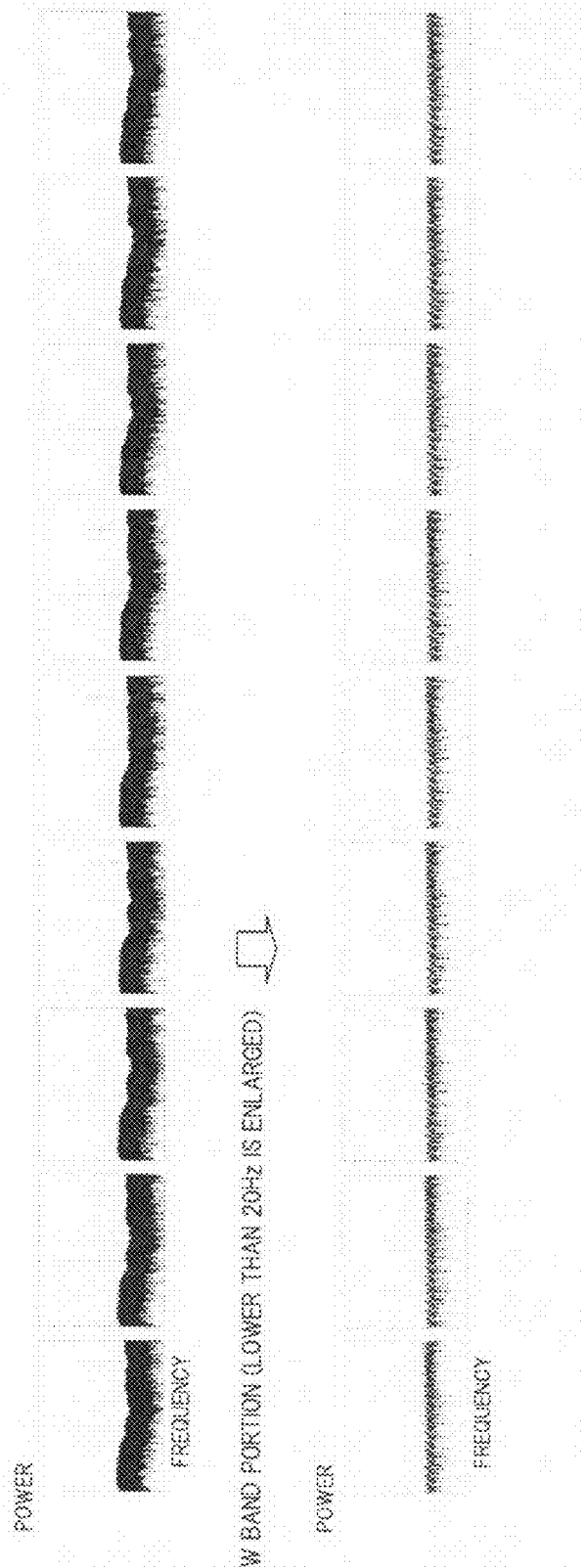

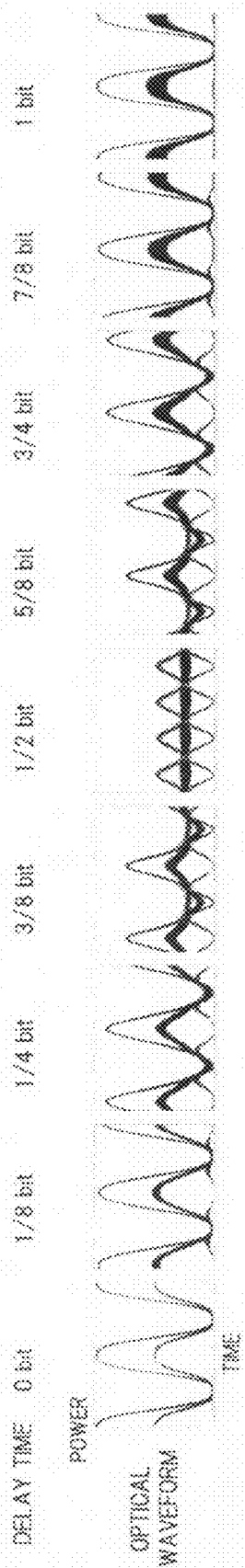
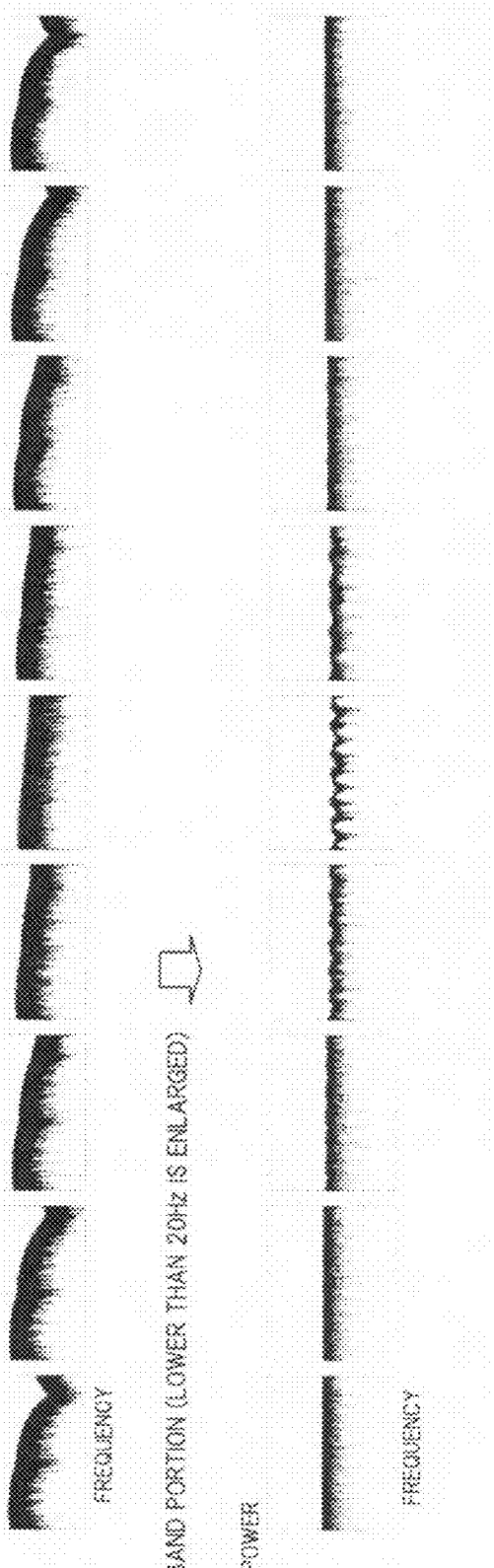
FIG. 9

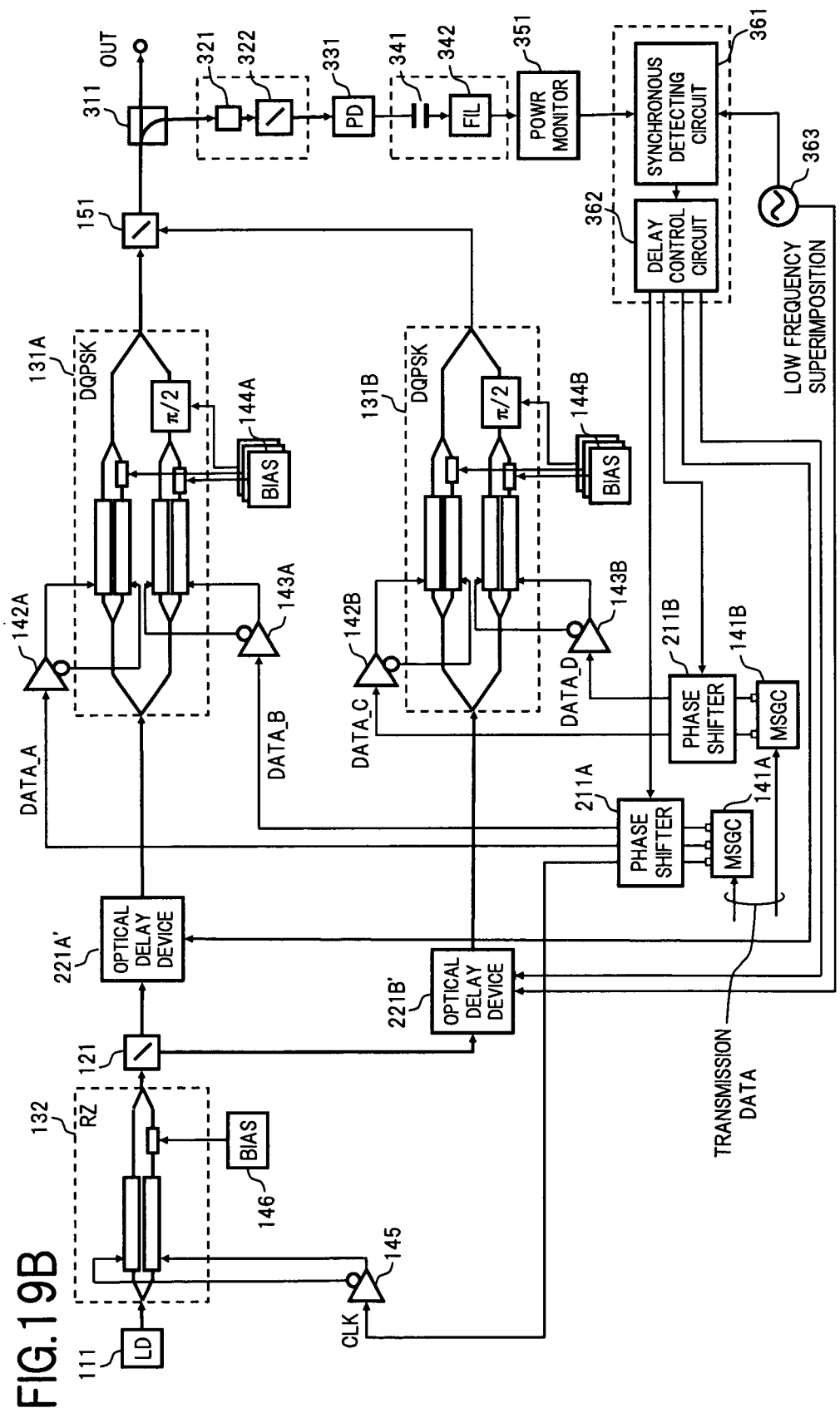

(D. van den Borne, et al., Journal of Lightwave Technology, Vol.25, No.1, pp.222-232, Jan. 2007.)

POLARIZATION MULTIPLEXED LIGHT TRANSMITTER AND CONTROL METHOD THEREOF

CROSS-REFERENCE TO RELATED APPLICATION

This application is based upon and claims the benefit of priority of the prior Japanese Patent Application No. 2008-232413, filed on Sep. 10, 2008, the entire contents of which are incorporated herein by reference.

FIELD

The embodiments discusses herein are directed to a polarization multiplexed light transmitter which applies a polarization multiplexing technology to transmit optical signals in optical communications and a control method thereof.

BACKGROUND

For realizing an ultrahigh speed optical transmission system of more than 40 Gbit/s, investigations for a polarization multiplexing technology have been actively made. The polarization multiplexing technology is a format of multiplexing two orthogonal polarized signals of same wavelengths, to transmit two independent signals. In the polarization multiplexing technology, since two polarization states can be utilized, it is possible to reduce a baud rate of transmission signal and to increase frequency utilization efficiency.

For an optical transmission system using this polarization multiplexing technology, there have been proposed various types of control technologies relating to polarization tracking mainly in a reception section (refer to Japanese Laid-Open Patent Application Publication No. 2002-344426). It has been known that, in the polarization multiplexing optical transmission system, degradation of transmission characteristics, which is caused by a fiber nonlinear effect and polarization mode dispersion (PMD), differs according to pulse timing between orthogonal polarization components in the polarization multiplexed light (refer to D. van den Borne, et. al., "1.6-b/s/Hz Spectrally Efficient Transmission Over 1700 km of SSMF Using 40×85.6-Gb/s POLMUX-RZ-DQPSK", Journal of Lightwave Technology, Vol. 25, No. 1, pp. 222-232, Jan. 2007, 2).

To be specific, for pulse (bit) allocation between the orthogonal polarization components in the polarization multiplexed light as illustrated in a left side of FIG. 30, in view of fiber nonlinear proof strength, bit-interleaved polarization multiplexing which shifts pulses of the orthogonal polarization components to each other by a half bit, achieves excellent transmission characteristics (refer to the right side of FIG. 30). On the other hand, in view of PMD proof strength, bit-aligned polarization multiplexing which makes the pulse timing between the orthogonal polarization components in the polarization multiplexed light to be in-phase, achieves the excellent transmission characteristics (refer to the center of FIG. 30). Accordingly, in order to obtain desired transmission characteristics, it is necessary to set the above pulse timing according to a state of the optical transmission system.

However, in the conventional polarization multiplexing optical transmission system, the pulse timing between the orthogonal polarization components is fixed when an apparatus for generating the polarized multiplexed light is initially set. Accordingly, even though a change in system state, such as, time variation in the PMD, wavelength path modification, wavelength spacing modification or the like, is caused, it is impossible to regulate the pulse timing between the orthogonal polarization components according to such a change. Therefore, there is a problem in that the transmission characteristics are considerably degraded depending on the system state.

In order to solve the above problem and to enable the pulse timing between the orthogonal polarization components to be modifiable, there may be considered, for example, a configuration in which a plurality of transmitters corresponding to different pulse timings is previously prepared, and those transmitters are switched to be used according to the system state. However, if the plurality of transmitters is disposed, there are drawbacks of large-scale of the apparatus, complexity thereof and high-cost performance thereof. Further, in a configuration which modifies the pulse timing between the orthogonal polarization components in one transmitter in manual according to the system state, the modifying work of pulse timing takes time, and therefore, in a case where the system state is changed quickly and frequently, it is difficult to cope with such changes in system state.

SUMMARY

According to an aspect of the invention, a polarization multiplexed light transmitter which transmits a polarization multiplexed light containing a first optical signal and a second optical signal of which polarization states are mutually orthogonal, includes: a delay regulating unit configured to regulate relative delay times of the first and second optical signals; and a delay control unit configured to make orthogonal polarization components contained in a monitor light which is obtained by taking out a part of the polarization multiplexed light to interfere with each other, to thereby generate a polarization interfering light, and configured to judge a delay time between the first and second optical signals based on a change in state of an electric signal which is obtained by photo-electrically converting the polarization interfering light, and configured to control regulation amounts in the delay regulating unit so that the judged delay time reaches a predetermined value.

Further, one aspect of a control method of the polarization multiplexed light transmitter which transmits a polarization multiplexed light containing a first optical signal and a second optical signal of which polarization states are mutually orthogonal, the control method including: taking out a part of the polarization multiplexed light as a monitor light; making orthogonal polarization components contained in the taken out monitor light, to interfere with each other, to thereby generate a polarization interfering light; judging a delay time between the first and second optical signals based on a change in a state of an electric signal which is obtained by photo-electrically converting the generated polarization interfering light; and controlling relative delay times of the first and second optical signals so that the judged delay time reaches a predetermined time.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING

FIG. 8 is a diagram illustrating one example in which an optical waveform of a Pol-MUX_RZ_DQPSK signal light and an electric spectrum thereof are calculated;

FIG. 9 is a diagram illustrating one example in which an optical waveform of a polarization interfering light and an electric spectrum thereof are calculated, for the Pol-MUX_RZ_DQPSK signal light;

FIG. 19B is a block diagram illustrating a configuration of an applied example relating to the first and second embodiments;

DESCRIPTION OF EMBODIMENTS

Figure 1:
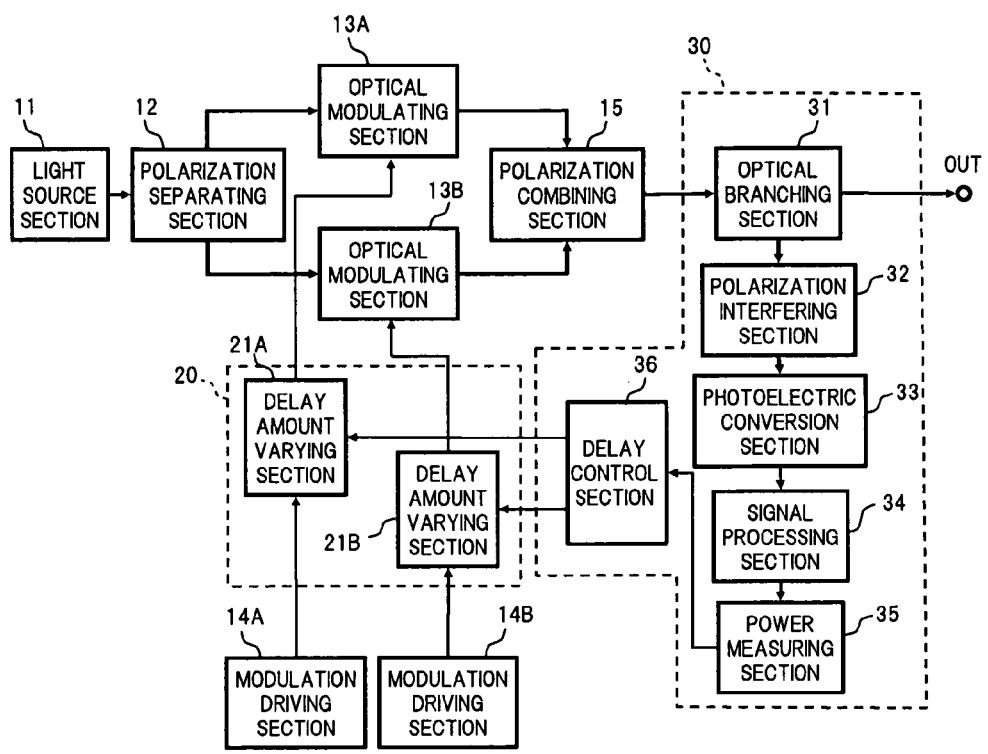
FIG. 1 is a block diagram illustrating a configuration of a polarization multiplexed light transmitter in a first embodiment.

As described hereinbefore, the conventional polarization multiplexing optical transmission system has a problem in that pulse timing between orthogonal polarization components is not adjustable according to a change in system state. As one of measures for coping with this problem, the applicant of this invention has proposed, in the prior Japanese Patent Application No. 2008-119011, a technology for: receiving, in a reception unit, a polarization multiplexed light transmitted from a transmission unit to an optical transmission path; monitoring information relating to transmission characteristics of the received polarization multiplexed light to transfer a monitoring result to the transmission unit; and controlling, in the transmission unit, an inter-polarized channel delay time based on the transmission characteristics information from the reception unit. This prior invention is effective for solving the above problem, but a configuration of a control system is complicated. Further, a feedback loop made up between the transmission unit and the reception unit is long, and therefore, a problem in that a control time is long still remains.

Therefore, in order to solve the problem in the conventional technology as well as the problem in the prior invention, this invention proposes a polarization multiplexed light transmitter capable of flexibly varying at a high speed, with a simple configuration, a delay time between the orthogonal polarization components in the polarization multiplexed light, and also, capable of suppressing transmission characteristics degradation of the polarization multiplexed light due to the change in system state; and a control method thereof. There will be described embodiments for implementing this invention, with reference to the accompanying drawings. The same reference numerals denote the same or equivalent parts in all drawings.

FIG. 1 is a block diagram illustrating a configuration of a polarization multiplexed light transmitter in a first embodiment.

In FIG. 1, the polarization multiplexed light transmitter in the first embodiment comprises: a light source section 11; a polarization separating section 12; a pair of optical modulating sections 13A, 13B; a pair of modulation driving sections 14A, 14B; a polarization combining section 15; a delay regulating unit 20; and a delay control unit 30. Further, the delay regulating unit 20 includes a pair of delay amount varying sections 21A and 21B, and the delay control unit 30 includes an optical branching section 31, a polarization interfering section 32, a photoelectric conversion section 33, a signal processing section 34, a power measuring section 35 and a delay control section 36.

The light source section 11 generates a continuous light or an optical pulse train having a required wavelength, to output it to the polarization separating section 12.

The polarization separating section 12 separates the output light from the light source section 11 to two lights of which polarization states are mutually orthogonal, and outputs one of the two lights to the optical modulating section 13A while outputting the other light to the optical modulating section 13B.

To the optical modulating sections 13A and 13B, the lights polarization separated by the polarization separating section 12 are input, while holding the polarization states thereof, and the optical modulating sections 13A and 13B modulate the input lights in accordance with modulation signals output from the modulation driving sections 14A and 14B, and thus, generate first and second optical signals (sometimes to be referred to as polarized channels, hereunder) corresponding to a desired optical modulation format, to thereby output the first and second optical signals to the polarization combining section 15. As the modulation format for the respective optical signals output from the optical modulating sections 13A and 13B, it is possible to apply, for example, an intensity modulation format such as NRZ (Non Return to Zero), RZ (Return to Zero), CS-RZ (Carrier-Suppressed Return to Zero), Duobinary or the like; a phase modulation format such as QPSK (Quadrature Phase Shi Keying), DQPSK (Differential Quadrature Phase Shift Keying), DBPSK (Differential Binary Phase Shift Keying) or the like; or a combination of the intensity modulation format and the phase modulation format.

The modulation driving sections 14A and 14B generate the modulation signals corresponding to the modulation format of the optical modulating sections 13A and 13B, in accordance with transmission data fed from the outside or the like, to supply them to the optical modulating sections 13A and 13B via the delay amount varying sections 21A and 21B.

The polarization combining section 15 combines the orthogonal polarized optical signals output from the optical modulating sections 13A and 13B into one light. The combined polarization multiplexed light passes through the optical branching section 31 in the delay control unit 30 to be transmitted from an output port OUT of the present polarization multiplexed light transmitter to the outside.

Figure 2:
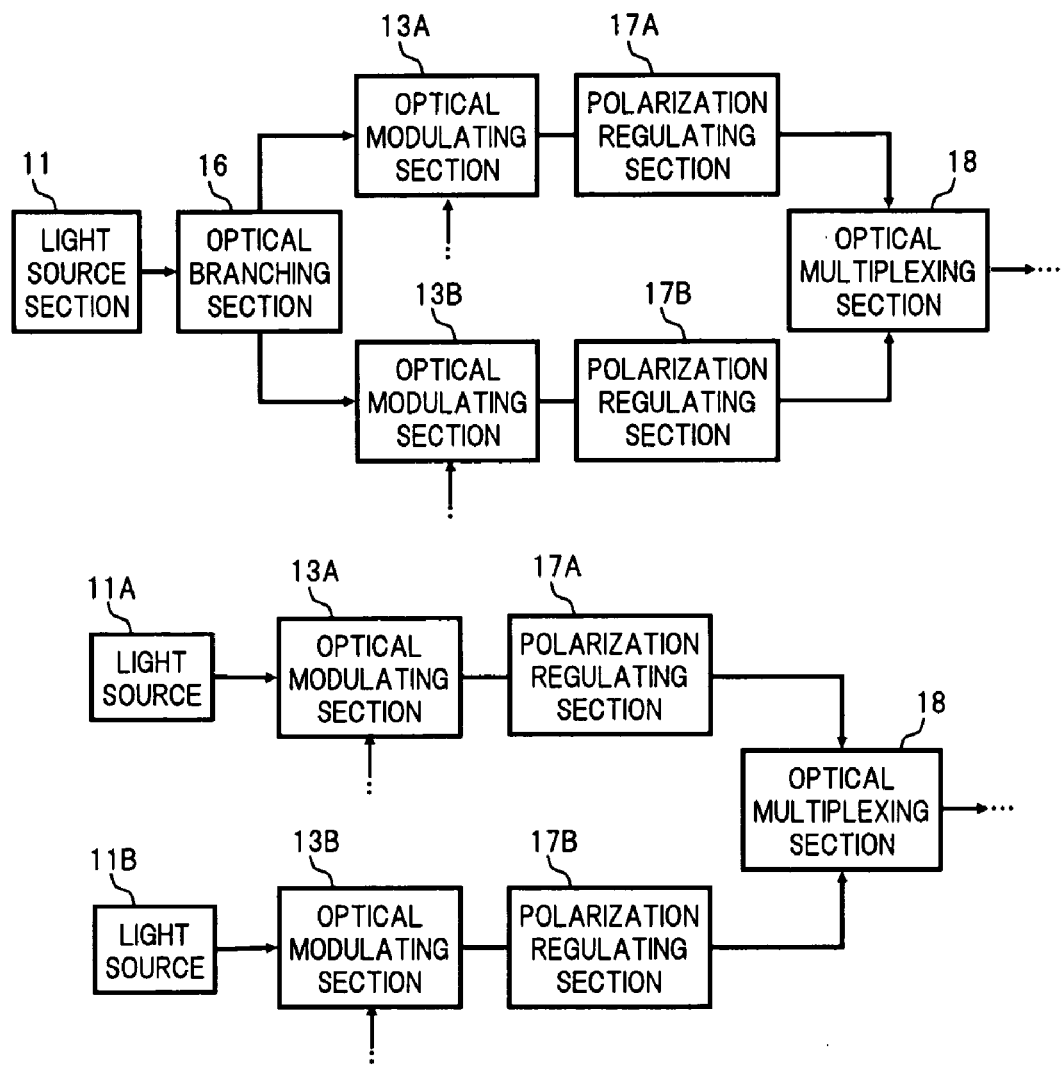
FIG. 2 is a block diagram illustrating a modified example relating to a polarization separating section and a polarization combining section.

Incidentally, herein, the configuration example is described in which the two polarization components are branched and combined using the polarization branching section 12 and the polarization combining section 15. However, this invention is not limited thereto, and it is also possible to apply a configuration in which an optical branching section 16, polarization regulating sections 17A and 17B, and an optical multiplexing section 18 are combined with each other, as illustrated in an upper stage of FIG. 2. In this configuration, the output light form the light source section 11 is branched into two lights by the optical branching section 16, and thereafter, the two branched lights are respectively modulated by the optical modulating sections 13A and 13B, and the respective modulated lights are input to the corresponding polarization regulating sections 17A and 17B. In the polarization regulating sections 17A and 17B, polarization states of the two modulated lights are regulated to be mutually orthogonal. As specific configuration examples of the polarization regulating sections 17A and 17B, a λ/4 plate may be disposed to one of the polarization regulating sections 17A and 17B while a −λ/4 plate being disposed to the other thereof, to make the polarization states of the two modulated lights to be mutually orthogonal. Or a λ/2 plate may be disposed to one of the polarization sections 17A and 17B, to realize the orthogonal polarization. Otherwise, variable polarization controlling devices may be disposed to both the polarization regulating sections 17A and 17B and the respective output lights are fed back, to thereby regulate the polarization states of the two modulated lights to be mutually orthogonal. Then, the output lights from the polarization regulating sections 17A and 17B are fed to the optical multiplexing section 18 so that the polarization multiplexed light is generated. Further, it is also possible to apply a configuration in which two light sources 11A and 11B are used as the light source section 11 and output lights from the light sources 11A and 11B are supplied to the optical modulating sections 13A and 13B, as illustrated in a lower stage of FIG. 2. In this case, it is possible to realize the light source section 11 by using two low power light sources.

The optical branching section 31 branches a part of the polarization multiplexed light sent from the polarization combining section 15 to the output port OUT as a monitor light, to output the monitor light to the polarization interfering section 32.

The polarization interfering section 32 makes the orthogonal polarization components (polarized channels) contained in the monitor light from the optical branching section 31 to interfere with each other, to generate a polarization interfering light, and outputs the polarization interfering light to the photoelectric conversion section 33. It is possible to realize such a polarization interfering section 32 by various types of configurations as illustrated in FIG. 3 to FIG. 7 for example.

Figure 3:
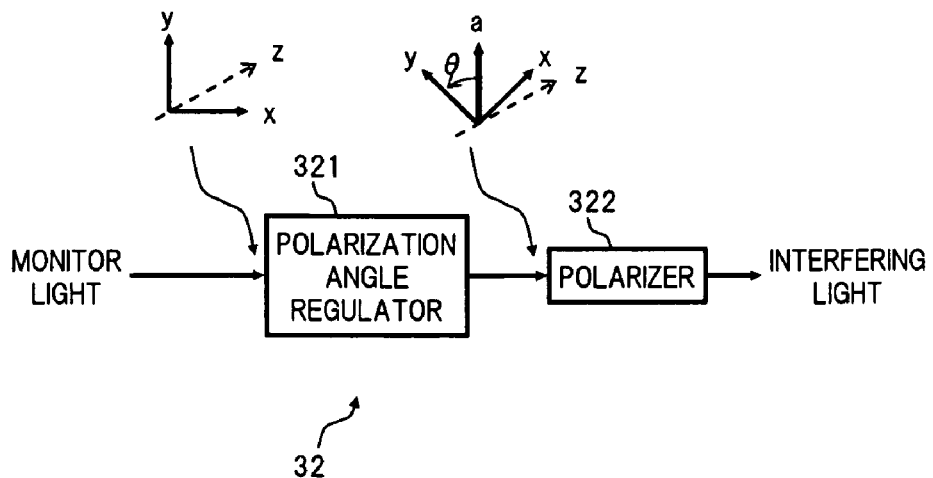
FIG. 3 is a block diagram illustrating a first configuration example of a polarization interfering section.

A first configuration example of the polarization interfering section 32 illustrated in FIG. 3 includes a polarization angle regulator 321 and a polarizer 322. The polarization angle regulator 321 is fed with the monitor light from the optical branching section 31, and regulates a polarization angle of the monitor light so that polarization directions of orthogonal polarized channels "x" and "y" in the monitor light are deviated from a direction of main axis "a" of the polarizer 322. Incidentally, a z-direction illustrated by a broken line arrow in the figure indicates an optical axis direction of the monitor light. The polarizer 322 is fed with the monitor light of which polarization angle is regulated by the polarization angle regulator 321, thereby generating a light obtained by making the polarized channels "x" and "y" in the monitor light to interfere with each other, to output the polarization interfering light to the photoelectric conversion section 33. If a deviation angle of the polarization direction of the one polarized channel "y" relative to the direction of the main axis "a" of the polarizer 322 is θ, this deviation angle θ is desirable to be 45°+360°×N (N is integer). By regulating the deviation angle θ to be 45°+360°×N, it becomes possible to efficiently generate the polarization interfering light.

Figure 4:
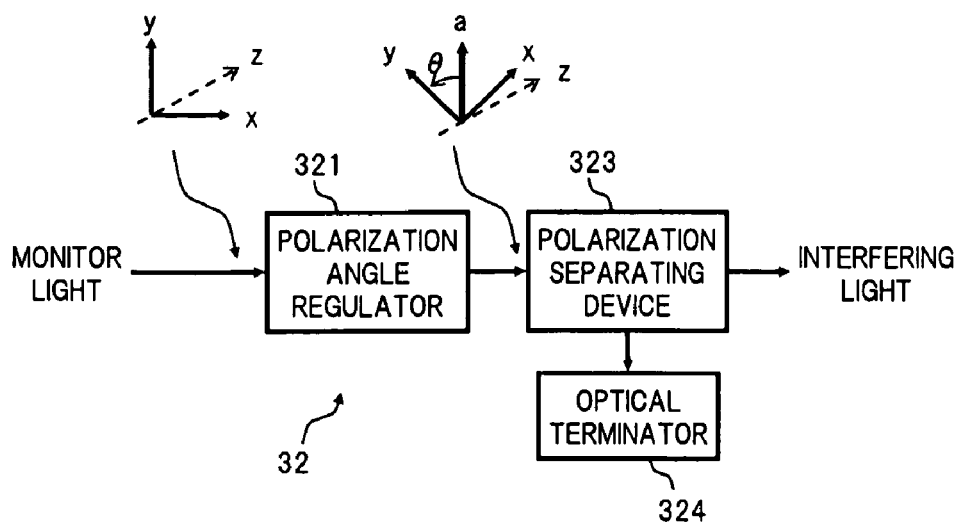
FIG. 4 is a block diagram illustrating a second configuration example of the polarization interfering section.

A second configuration example of the polarization interfering section 32 illustrated in FIG. 4 applies a polarization separating device 323 in place of the polarizer 322 in the first configuration example of FIG. 3. Also in the second configuration example, in the polarization angle regulator 321, the polarization angle of the monitor light is regulated, so that the polarization directions of the orthogonal polarized channels "x" and "y" in the monitor light output from the optical branching section 31 are deviated from a direction of a main axis "a" of the polarization separating device 323 (desirably, the deviation angle θ is to be 45°+360°×N). The polarization separating device 323 is fed with the output light from the polarization angle regulator 321 to generate a light obtained by making the polarized channels "x" and "y" in the monitor light to interfere with each other, to thereby output the polarization interfering light from first and second output ports thereof. Herein, the polarization interfering light output from the first output port of the polarization separating device 323 is sent to the photoelectric conversion section 33, and an optical terminator 324 is connected to the second output port of the polarization separating device 323.

Incidentally, in the first and second configuration examples of the above polarization interfering section 32, the explanation has been made on the case where the polarization angle of the monitor light is regulated using the polarization separating device 323. However, in place of the polarization separating device 323, a branching port of the optical branching section 31 may be connected via a polarization-preservation fiber to an input port of the polarizer 322 or the polarization separating device 323, to thereby add required angle deviation when the polarization-preservation fiber is splice connected to the respective ports.

Figure 5:
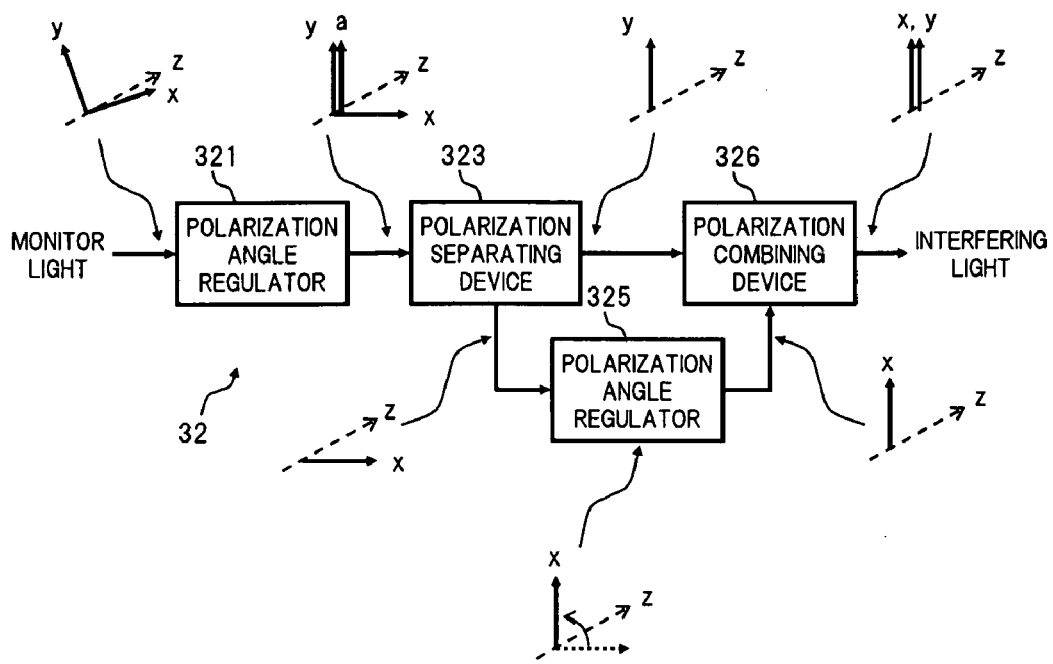
FIG. 5 is a block diagram illustrating a third configuration example of the polarization interfering section.

In a third configuration example of the polarization interfering section 32 illustrated in FIG. 5, in place of the optical terminator 324 in the second configuration example of FIG. 4, a polarization angle regulator 325 is connected to the second output port of the polarization separating device 323, and further, a polarization combining device 326 is disposed for combining an output light from the polarization angle regulator 325 with the output light from the first output port of the polarization separating device 323. In the third configuration example, the polarization angle of the monitor light is regulated by the polarization angle regulator 321, so that the polarization direction of one of the orthogonal polarized channels "x" and "y" in the monitor light output from the optical branching section 31 (herein, the polarization direction of the polarized channel "y") is coincident with the main axis "a" of the polarization separating device 323. The output light from the polarization angle regulator 325 is fed to the polarization separating device 323, so that the polarized channel "y" is output from the first output port of the polarization separating device 323, whereas the polarized channel "x" is output from the second output port of the polarization separating device 323. The polarization direction of the polarized channel "x" output from the second output port of the polarization separating device 323 is rotated by 90° in the polarization angle regulator 325, to be in the same polarization direction as that of the polarized channel "y". Then, the polarized channel "y" output from the first output port of the polarization separating device 323 and the polarized channel "x" of which polarization direction is rotated by 90° by the polarization angle regulator 325, are input to the polarization combining device 326, so that the light obtained by making the polarized channels "x" and "y" to interfere with each other is generated, and the polarization interfering light is sent to the photoelectric conversion section 33.

Figure 6:
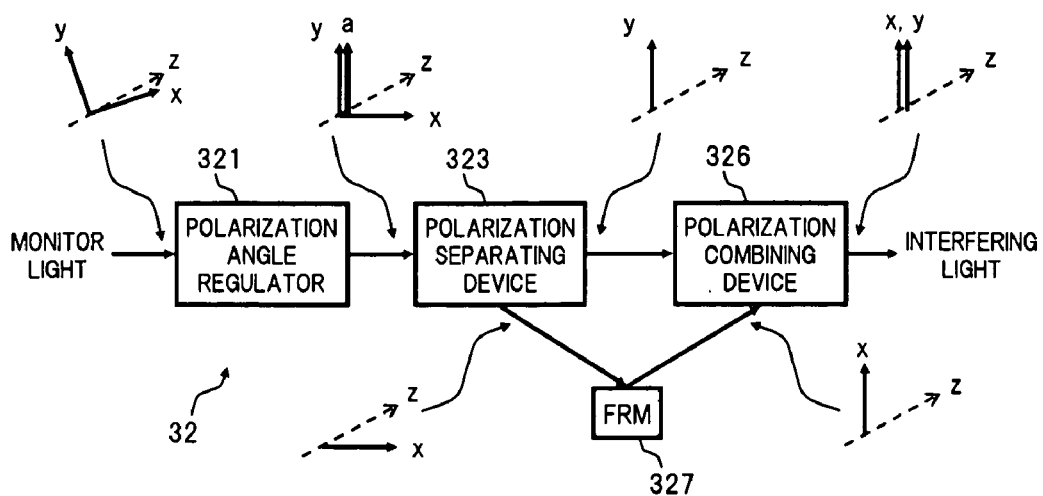
FIG. 6 is a block diagram illustrating a fourth configuration example of the polarization interfering section.

In a fourth configuration example of the polarization interfering section 32 illustrated in FIG. 6, in place of the polarization angle regulator 325 used in the third configuration example of FIG. 5, a faraday rotating mirror (FRM) 327 is disposed. The FRM 327 has optical characteristics of rotating a polarization angle by 90° when reflecting an incident light. Herein, the polarized channel "x" output from the second output port of the polarization separating device 323 is reflected from the FRM 327, so that the polarization direction of the polarized channel "x" is made to be same as that of the polarized channel "y". As a result, similarly to the third configuration example, the light obtained by making the polarized channels "x" and "y" to interfere with each other is generated in the polarization combining device 326, and the polarization interfering light is sent to the photoelectric conversion section 33.

Figure 7:
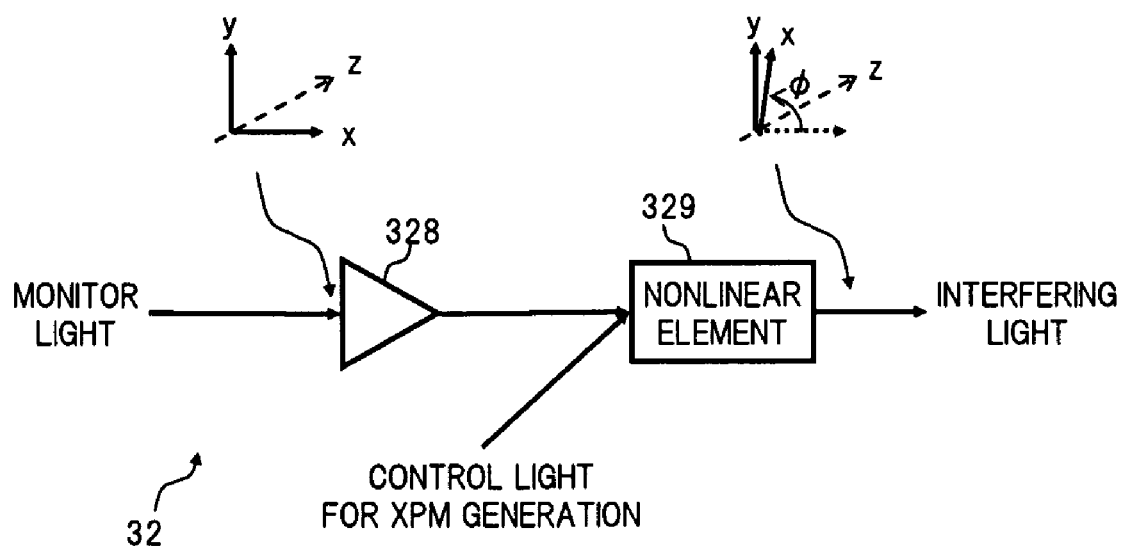
FIG. 7 is a block diagram illustrating a fifth configuration example of the polarization interfering section.

A fifth configuration example of the polarization interfering section 32 illustrated in FIG. 7 includes an optical amplifier 328 and a nonlinear element 329. The optical amplifier 328 receives the monitor light from the optical branching section 31, and amplifies the power of the monitor light up to a level at which a nonlinear effect can be generated in the latter staged nonlinear element 329, to output the amplified monitor light. The nonlinear element 329 receives the monitor light amplified by the optical amplifier 328 and a control light fed from the outside or the like, and similarly to an operating principle of a known optical Kerr switch, rotates the polarization directions of the polarized channels in the monitor light, by cross phase modulation (XPM) which is one of nonlinear effects. For example, the polarization direction of the polarized channel "x" in the monitor light is rotated by a predetermined angle φ, by XPM generated in the nonlinear element 329, so that a component, which is parallel to the polarized channel "y", in the rotated polarized channel "x", and the polarized channel "y" interfere with each other, and consequently, the polarization interfering light is sent to the photoelectric conversion section 33 from the nonlinear element 329.

Incidentally, the first to fifth configuration examples for the polarization interfering section 32 have been recited. However, the polarization interfering section to be used in the invention is not limited to the above configuration examples, and it is possible to apply arbitrary configurations capable of making the orthogonal polarized channels "x" and "y" in the monitor light to interfere with each other.

The photoelectric conversion section 33 (FIG. 1) receives the polarization interfering light output from the polarization interfering section 32, and converts the input light into an electric signal to output it.

The signal processing section 34 eliminates at least a direct current (DC) component from the electric signal output from the photoelectric conversion section 33, to extract an alternate current (AC) component.

For a frequency band of the alternate current component extracted by the signal processing section 34, by ensuring a broader band thereof, it becomes possible to increase a measured power in the latter staged power measuring section 35. However, as described later in detail, since an inter-polarized channel delay time can be judged only by monitoring a change in power of a part of the alternate current component of the polarization interfering light, it is also possible to restrict the frequency band of the alternate current component extracted by the signal processing section 34. In the case where a high-frequency circuit is applied to a monitoring system, such an application increases a size of the polarization multiplexed light transmitter and a cost thereof. Therefore, in view of the miniaturization and low-cost performance of the polarization multiplexed light transmitter, it is desirable to decrease the frequency band of the alternate current component extracted by the signal processing section 34, and to be specific, it is preferable to restrict the frequency band to a lower side of a baud rate of modulation signal. It is possible to make up such a signal processing section 34 by a combination of a capacitor for eliminating the direct current component and a low-pass filter (LPF) or by using a band-pass filer (BPF).

The power measuring section 35 measures the power (the total power in the frequency band) of the alternate current component extracted by the signal processing section 34, to transfer a measurement result to the delay control section 36.

The delay control section 36 judges the inter-polarized channel delay time based on a change in the power measured by the power measuring section 35, to generate control signals for feedback controlling delay amounts of the delay amount varying sections 21A and 21B.

The delay amount varying section 21A feeds a variable delay amount to the modulation signal which is to be supplied to the optical modulating section 13A from the modulation driving section 14A. Further, the delay amount varying section 21B feeds a variable delay amount to the modulation signal which is to be supplied to the optical modulating section 13B from the modulation driving section 14B. The respective delay amounts of the delay amount varying sections 21A and 21B are controlled in accordance with the control signals from the delay control section 36. Incidentally, herein, the delay amount varying sections 21A and 21B are individually disposed corresponding to the respective optical modulating sections 13A and 13B. However, it is only necessary that a relative delay time between the modulation signals fed to the optical modulating sections 13A and 13B is variable, and therefore, it is possible to omit one of the two delay amount varying sections 21A and 21B.

Next, there will be described an operation of the first embodiment.

In the polarization multiplexed light transmitter of the above configuration, the output light from the light source section 11 is separated, by the polarization separating section 12, into two lights of which polarization states are mutually orthogonal. Thereafter, the separated two lights are modulated by the optical modulating sections 13A and 13B, and the respective modulated lights are combined by the polarization combining section 15 so that the polarization multiplexed light is generated. This polarization multiplexed light is transmitted to an optical transmission path (not illustrated in the figure) or the like connected to the output port OUT, and also, a part thereof is branched by the optical branching section 31 as the monitor light, to be fed to the polarization interfering section 32.

In the polarization interfering section 32, the light obtained by making the orthogonal polarized channels "x" and "y" in the monitor light to interfere with each other is generated. This polarization interfering light is converted into the electric signal by the photoelectric conversion section 33. Thereafter, the alternate current component in the electric signal is extracted by the signal processing section 34, and the power of the alternate current component is measured by the power measuring section 35, and further, the measurement result is transferred to the delay control section 36.

In the delay control section 36, the inter-polarized channel delay time is judged based on the measurement result in the power measuring section 35, namely, the change in the power of the alternate current component in the electric signal obtained by photo-electrically converting the polarization interfering light.

Here, there will be described in detail a judging method of the inter-polarized channel delay time in the delay control section 36. In the following description, it is assumed that the RZ-DQPSK modulation is performed in each of the optical modulating sections 13A and 13B, and a signal light (to be expressed as Pol-MUX_RZ-DQPSK signal light, hereunder) obtained by polarization multiplexing RZ-DQPSK signal lights generated in the optical modulating sections 13A and 13B by the polarization combining section 15, is transmitted. Note, a bit rate of the Pol-MUX_RZ-DQPSK signal light is set at 43 Gbps.

FIG. 8 is one example in which an optical waveform of the Pol-MUX_RZ-DQPSK signal light transmitted from the output port OUT of the polarization multiplexed light transmitter and an electric spectrum thereof are calculated according to the inter-polarized channel delay time. An upper stage of FIG. 8 indicates the optical waveform, a medium stage thereof indicates the electric spectrum of the alternate current component for when the frequency band is restricted to the level up to 50 GHz, and a lower stage thereof indicates the electric spectrum in which the frequency band equal to or lower than 2 GHz is enlarged.

It is understood from FIG. 8 that, if the delay time between the RZ-DQPSK signal lights (polarized channels) generated by the optical modulating sections 13A and 13B is changed, the optical waveform of the Pol-MUX_RZ-DQPSK signal light transmitted from the polarization multiplexed light transmitter is varied, and therefore, when the optical waveform for when the delay time is 0 bit time (time slot) or 1 bit time is compared with the optical waveform for when the delay time is ½ bit time, there is a remarkable difference therebetween. On the other hand, a significant variation does not occur in the electric spectrum of the Pol-MUX_RZ-DQPSK signal light, even if the inter-polarized channel delay time is changed. Namely, it is difficult to judge the inter-polarized channel delay time only by directly photo-electrically converting the Pol-MUX_RZ-DQPSK signal light transmitted from the polarization multiplexed light transmitter to monitor the electric spectrum thereof. Therefore, in the present embodiment, the optical branching section 31 takes out the part of the polarization multiplexed signal light transmitted from the polarization multiplexed light transmitter as the monitor light, and the polarization interfering section 32 makes the orthogonal polarized channels in the monitor light to interfere with each other, to thereby generate the polarization interfering light, so that the inter-polarized channel delay time can be judged based on a change in an electric spectrum of the polarization interfering light.

FIG. 9 is one example in which, for the Pol-MUX_RZ-DQPSK signal light in FIG. 8, an optical wave of the polarization interfering light obtained by making the orthogonal polarized channels to interfere with each other and the electric spectrum thereof are calculated. Further, FIG. 10 illustrates the enlarged electric spectrum (the alternate current component up to 50 GHz) in FIG. 9 for when the inter-polarized channel delay time is 0 bit time, ¼ bit time and ½ bit time.

Figure 10:
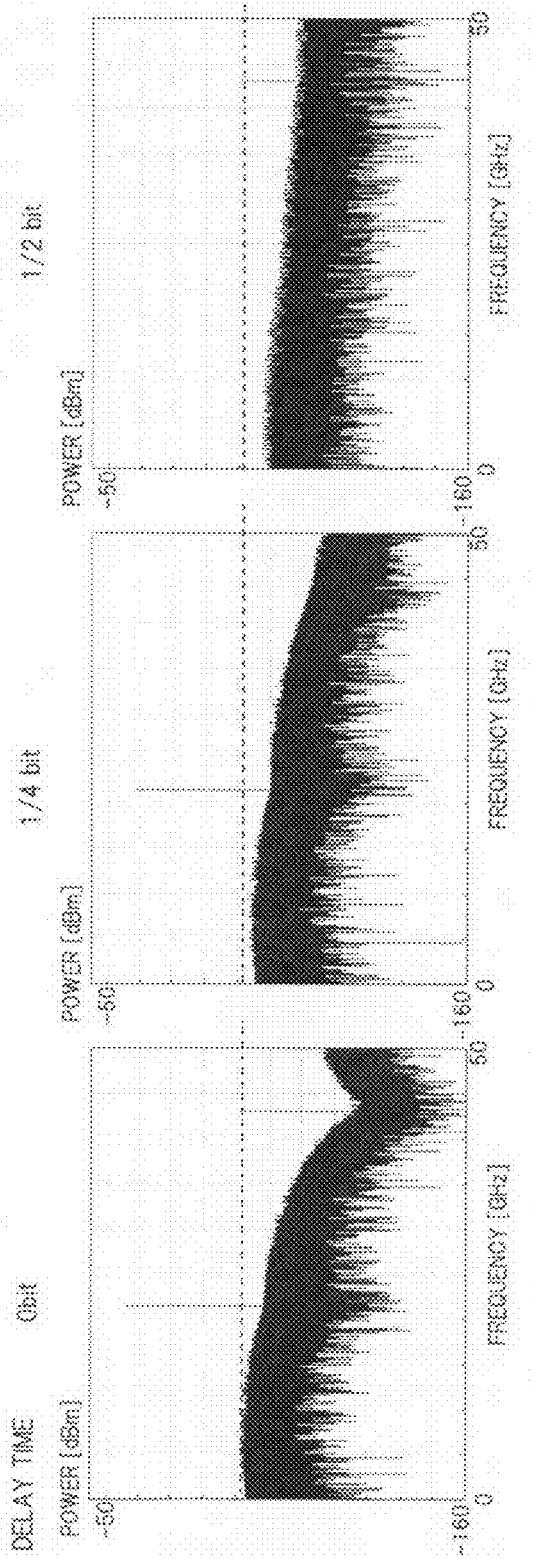
FIG. 10 is an enlarged diagram of the electric spectrum illustrated in FIG. 9 for when an inter-polarized channel delay time is 0 bit time, ¼ bit time and ½ bit time.

As illustrated in FIG. 9 and FIG. 10, for the electric signal obtained by photo-electrically converting the polarization interfering light, the total power of the alternate current component is decreased if the inter-polarized channel delay time is increased from 0 bit time to ½ bit time. Further, if the inter-polarized channel delay time is increased from ½ bit time to 1 bit time, the total power of the alternate current component is increased. Namely, the power of the alternate current component in the electric signal obtained by photo-electrically converting the polarization interfering light becomes maximal when the inter-polarized channel delay time is n (n is integer) bit time, while becoming minimal when the inter-polarized channel delay time is (2n+1)/2 bit time.

Figure 11:
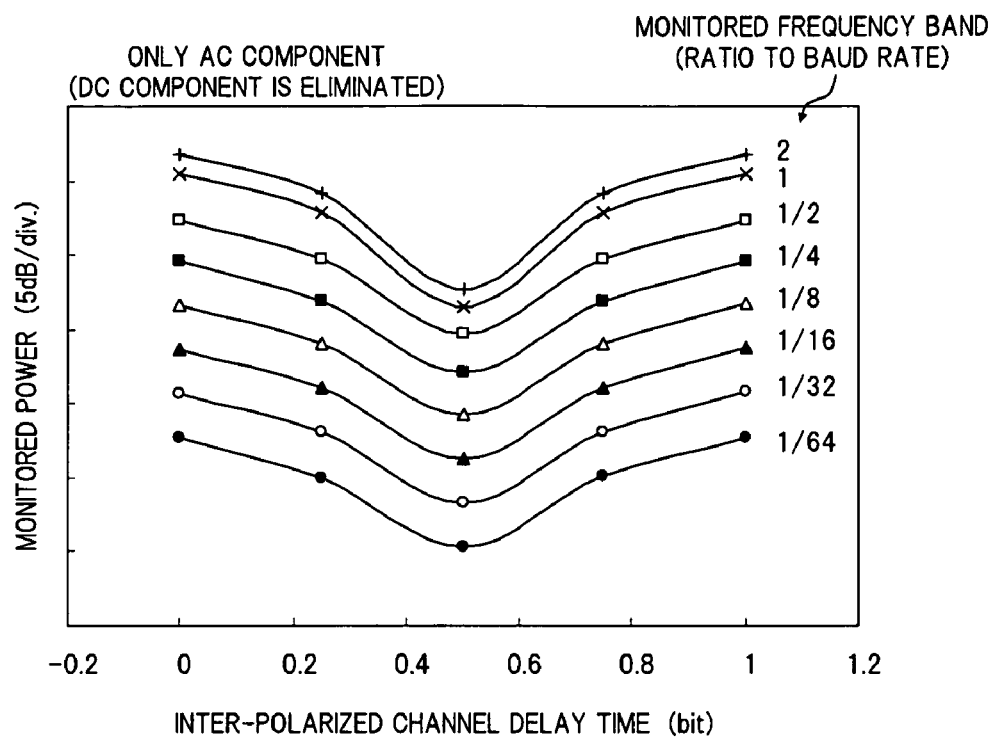
FIG. 11 is a graph illustrating a relation of measured power to the inter-polarized channel delay time according to a monitor frequency band.

Further, the power of the alternate current component in the electric signal obtained by photo-electrically converting the polarization interfering light is changed as illustrated in FIG. 11 for example, if the frequency band of the alternate current component to be monitored is changed. According to calculation results in FIG. 11, as the monitored frequency band (represented by a ratio to the baud rate of signal light in FIG. 11) becomes broader, the monitored power of the alternate current component is increased. However, a relation of the monitored power to the inter-polarized channel delay time becomes maximal when the inter-polarized channel delay time is 0 bit time or 1 bit time, while becoming minimal when the inter-polarized channel delay time is ½ bit time, regardless of the width of the monitored frequency band. Accordingly, as described before, it is also possible to judge the inter-polarized channel delay time based on the measured power in the power measuring section 35, by restricting the monitored frequency band to a low frequency alternate current component by the signal processing section 34 to achieve the miniaturization and low-cost performance of the polarization multiplexed light transmitter.

Figure 12:
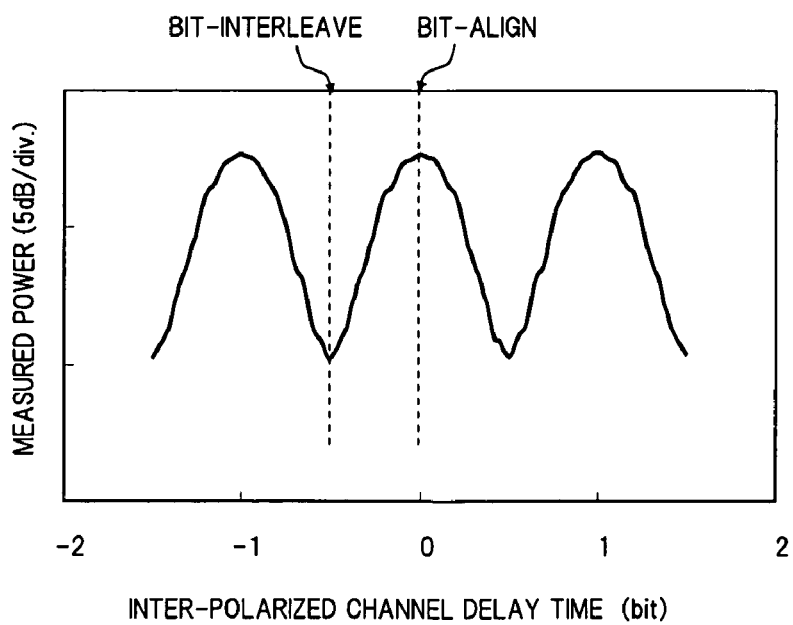
FIG. 12 is a graph illustrating a relation of the measured power to the inter-polarized channel delay time for when a LPF of which 3 dB bandwidth is 300 MHz is applied.

FIG. 12 is a diagram in which the relation between the power measured by the power measuring section 35 and the inter-polarized channel delay time is obtained by calculation, when the combination of the capacitor for eliminating the direct current component and the low-pass filter (LPF) of which 3 dB bandwidth is 300 MHz is applied. As illustrated in FIG. 12, it is also possible to judge the inter-polarized channel delay time based on the change in the measured power, by restricting the monitored frequency band to the low band of 300 MHz.

As a result of focusing on the characteristics of the polarization interfering light as described above, the delay control section 36 may feedback control the delay amount varying sections 21A and 21B so that the measured power becomes minimal, when the inter-polarized channel delay time is set to be bit-interleaved, whereas the delay control section 36 may feedback control the delay amount varying sections 21A and 21B so that the measured power becomes maximal, when the inter-polarized channel delay time is set to be bit-aligned. Further, it is also possible to set the inter-polarized channel delay time to be in between the bit-interleave and the bit-align. In this case, the delay control section 36 may feedback control the delay amount varying sections 21A and 21B, after performing an offset based on a relation between maximal and minimal. Namely, by applying this invention, it becomes possible set the inter-polarized channel delay time (pulse timing) at a desired value.

Incidentally, it is possible to realize the above feedback control relatively easy by superimposing the low frequency signal (dithering signal) on at least one of the modulation signals fed to the optical modulating sections 13A and 13B to observe a change amount in a dithering component contained in the monitoring result.

Figure 13:
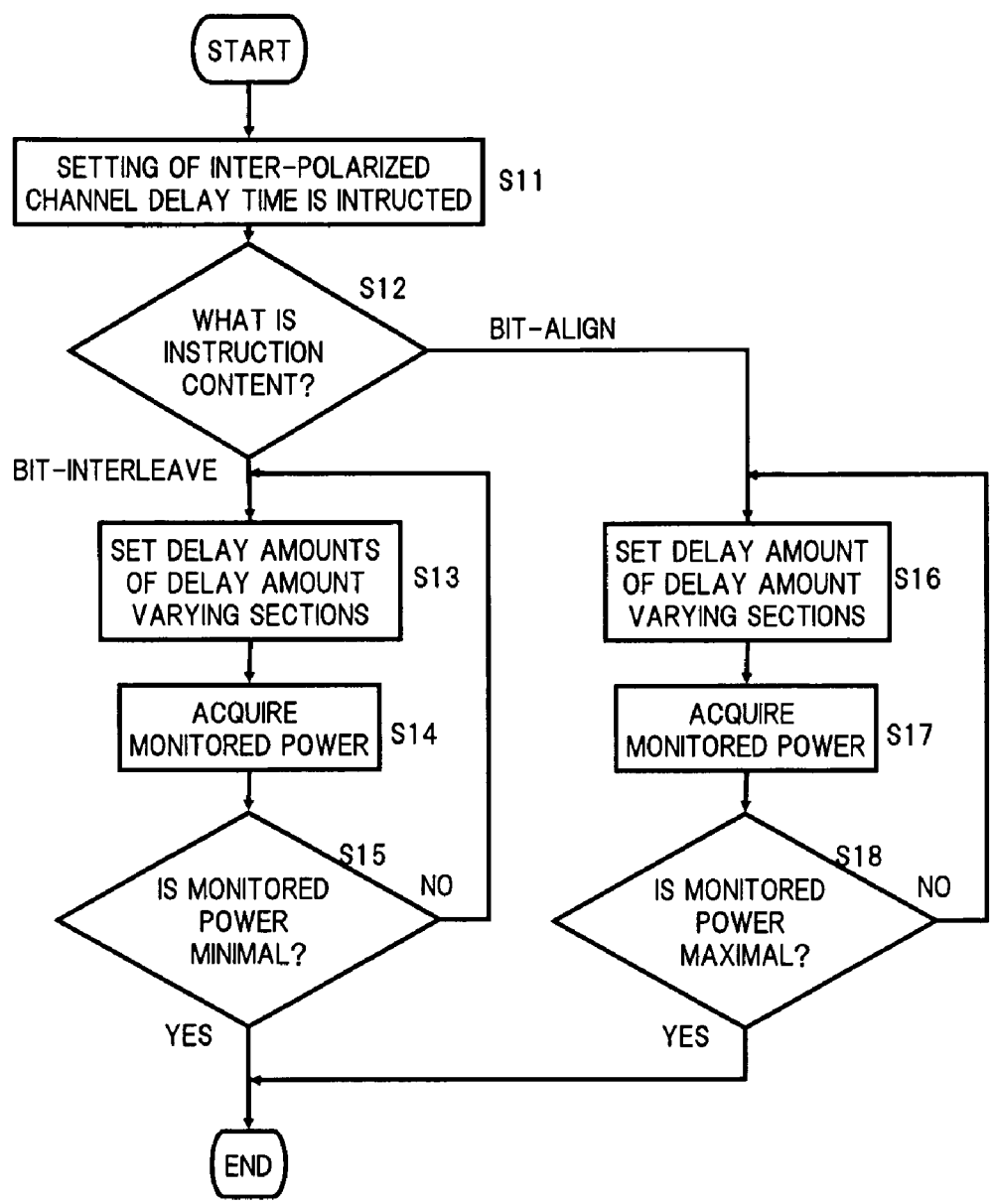
FIG. 13 is a flowchart illustrating a specific example of feedback control by a delay control section.

As one specific example of the feedback control by the delay control section 36, FIG. 13 illustrates a flowchart for when the inter-polarized channel delay time is set to be either bit-interleaved or bit-aligned. Firstly, the delay control section 36 is fed with an instruction as to which of bit-interleave and bit-align the inter-polarized channel delay time is to be set (step 11 (to be abbreviated as S11 in the figure, and same rule will be applied to subsequent steps)). This instruction may be fed to the delay control section 36 from the outside or the like, when the polarization multiplexed light transmitter is started up or when the system state is changed as a result that optical paths through which the polarization multiplexed light is transmitted are changed-over in an optical transmission system to which the polarization multiplexed light transmitter is applied. In the delay control section 36 received the above instruction, a judgment of the instruction is performed (S12), and when the inter-polarized channel delay time is set to be bit-interleaved, the routine proceeds to step 13, whereas when the inter-polarized channel delay time is set to be bit-aligned, the routine proceeds to step 16.

When the bit-interleave setting is instructed, firstly, the delay amounts of the delay amount varying sections 21A and 21B are set at initial values previously set corresponding to the bit-interleave (S13). Thus, the modulation signals delayed in accordance with the initial values by the delay amount varying sections 21A and 21B are fed to the optical modulating sections 13A and 13B, and the signal lights (polarized channels) modulated in accordance with the delayed modulation signals are combined by the polarization combining section 15, so that the polarization multiplexed light is generated. A part of the polarization multiplexed light is branched by the optical branching section 31 as the monitor light, and the monitor light is fed to the polarization interfering section 32, the photoelectric conversion section 33, the signal processing section and the power measuring section 35, in this sequence, so that the power of the alternate current component in the electric signal obtained by photo-electrically converting the polarization interfering light is measured, and the measurement result is transferred to the delay control section 36 (S14). In the delay control section 36, the change in the measured power of the power measuring section 35 is observed, and the delay amounts of the delay amount varying sections 21A and 21B are feedback controlled so that the measured power becomes minimal (S15). As a result, the polarization multiplexed light set to be interleaved is transmitted in stable from the output port OUT.

On the other hand, when the bit-align setting is instructed, firstly, the delay amounts of the delay amount varying sections 21A and 21B are set at initial values previously set corresponding to the bit-align (S16). Thus, the modulation signals delayed in accordance with the initial values by the delay amount varying sections 21A and 21B are fed to the optical modulating sections 13A and 13B, and the signal lights (polarized channels) modulated in accordance with the delayed modulation signals are combined by the polarization combining section 15 so that the polarization multiplexed light is generated. A part of the polarization multiplexed light is branched by the optical branching section 31 as the monitor light, and the monitor light is fed to the polarization interfering section 32, the photoelectric conversion section 33, the signal processing section 34 and the power measuring section 35, in this sequence, so that the power of the alternate current component in the electric signal obtained by photo-electrically converting the polarization interfering signal is measured, and the measurement result is transferred to the delay control section 36 (S17). In the delay control section 36, the change in the measured power of the power measuring section 35 is observed, and the delay amounts of the delay amount varying sections 21A and 21B are feedback controlled so that the measured power becomes maximal (S18). As a result, the polarization multiplexed light set to be bit-aligned is transmitted in stable from the output port OUT.

As described in the above, according to the polarization multiplexed light transmitter in the first embodiment, the change in the power of the alternate current component in the electric signal obtained by photo-electrically converting the polarization interfering light is monitored by the delay control unit 30 of simple configuration disposed inside thereof. Thus, the pulse timing between the orthogonal polarized channels contained in the polarization multiplexed light can be changed flexibly at a high speed, based on the monitoring result. Therefore, it is possible effectively suppress transmission characteristics degradation of the polarization multiplexed light due to the change in system state.

Next, there will be described specific practical examples corresponding to the first embodiment.

Figure 14:
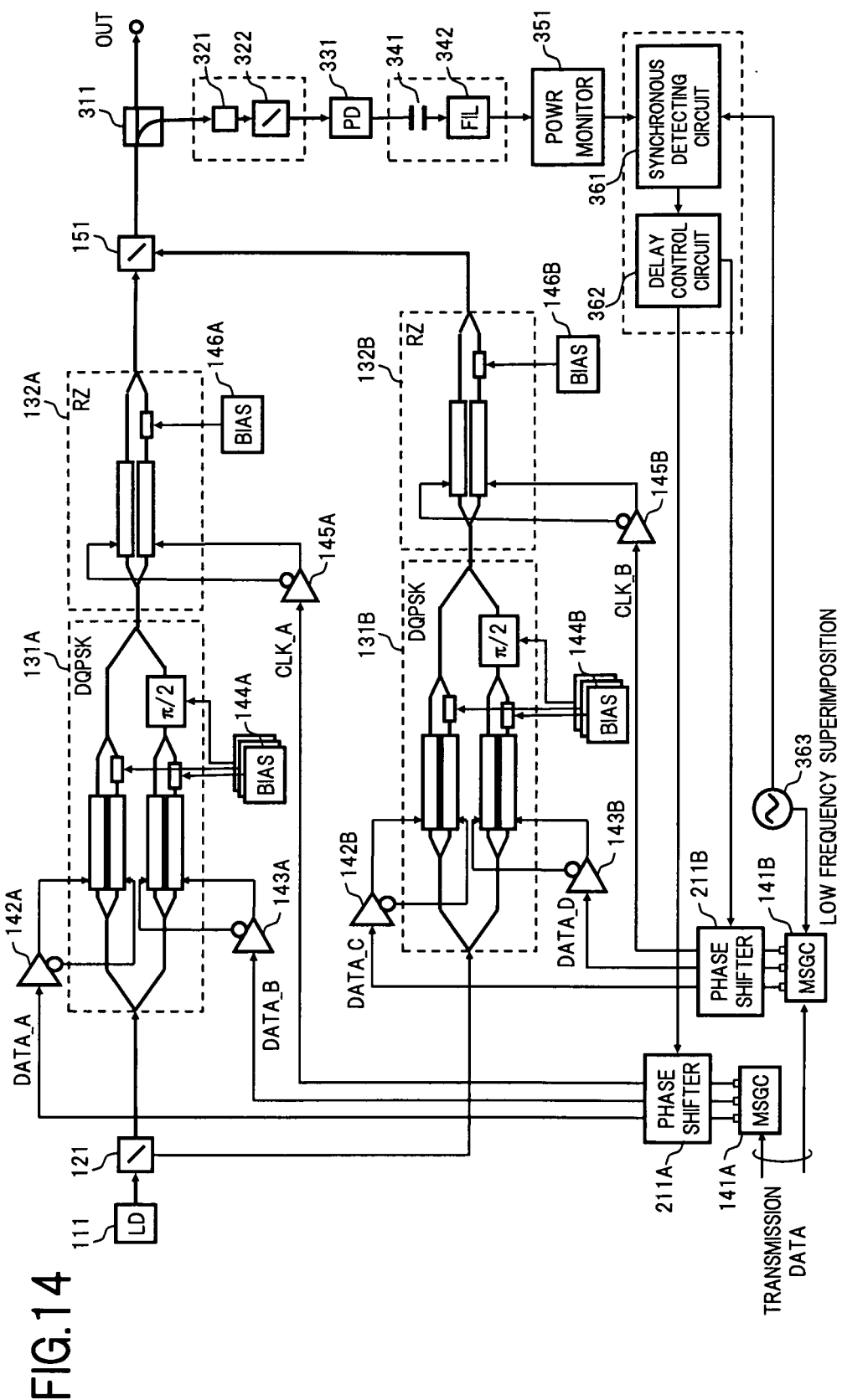
FIG. 14 is a block diagram illustrating a configuration of a practical example 1-1 corresponding to the first embodiment.

FIG. 14 is a block diagram illustrating a configuration of a practical example 1-1 of the polarization multiplexed light transmitter. This practical example 1-1 illustrates one example of specific configurations of the polarization multiplexed light transmitter for transmitting the above PolMUX_RZ-DQPSK signal light.

The polarization multiplexed light transmitter illustrated in FIG. 14 splits a continuous light output from a semiconductor laser (LD) 111 into two lights of which polarization states are mutually orthogonal by means of a polarization beam splitter 121, to feed one of the split lights to a DQPSK modulator 131A and a RZ modulator 132A which are cascade connected to each other, while feeding the other light to a DQPSK modulator 131B and a RZ modulator 132B which are cascade connected to each other.

The DQPSK modulator 131A is driven based on output signals from driver amplifiers 142A and 143A to which modulation signals DATA_A and DATA_B generated in accordance with transmission data by a modulation signal generating circuit (MSGC) 141A are fed via a phase shifter 211A, to DQPSK modulate the input light from the polarization beam splitter 121. Further, the RZ modulator 132A is driven based on an output signal from a driver amplifier 145A to which a clock signal CLK_A synchronized with the modulation signals DATA_A and DATA_B is fed via the phase shifter 211A, and intensity modulates the DQPSK modulated light output from the DQPSK modulator 131A, to generate a RZ-DQPSK modulated light.

The DQPSK modulator 131B is driven based on output signals from driver amplifiers 142B and 143B to which modulation signals DATA_C and DATA_D generated in accordance with transmission data by a modulation signal generating circuit (MSGC) 141B are fed via a phase shifter 211B, to DQPSK modulate the input light from the polarization beam splitter 121. Further, the RZ modulator 132B is driven based on an output signal from a driver amplifier 145B to which a clock signal CLK_B synchronized with the modulation signals DATA_C and DATA_D is fed via the phase shifter 211B, and intensity modulates the DQPSK modulated light output from the DQPSK modulator 131B, to generate a RZ-DQPSK modulated light. Incidentally, herein, a low frequency signal output from an oscillator 363 is superimposed on the clock signal CLK_B generated in the modulation signal generating circuit 141B, as a dithering signal.

The DQPSK modulators 131A and 131B each comprises, for example, a first Mach-Zehnder (MZ) optical waveguide formed on a substrate having an electro-optic effect, and second and third MZ optical waveguides disposed on a pair of branching arms of the first MZ optical waveguide. The input light from the polarization beam splitter 121 is branched into two lights by the first MZ optical waveguide, and the branched lights are input respectively to the second and third MZ optical waveguides on the branching arms. In the second and third MZ optical waveguides, the output lights from the driver amplifiers are applied to bias electrodes arranged along the branching arms, and refractive indexes of the branching arms are changed due to an electric field generated by the application of the output lights so that the guided lights are phase modulated in accordance with the transmission data. The phase modulated lights output from the second and third MZ optical waveguides are multiplexed by the first MZ optical waveguide, after one of the phase modulated lights is fed to a phase shifter in which the phase thereof is shifted by $\pi/2$. Incidentally, to the bias electrodes and the phase shifter on each of the second and third MZ optical waveguides, required bias voltages output from each of bias supply circuit 144A and 144B are supplied.

The RZ modulating sections 132A and 132B each comprises, for example, a MZ optical waveguide formed on a substrate having an electro-optic effect, and electrodes arranged along branching arms of the MZ optical waveguide. To the electrodes, the output signals from each of the driver amplifiers 145A and 145B are applied, and refractive indexes of the branching arms of the MZ optical waveguide are changed due to an electric field generated by the application of the output signals so that the DQPSK modulated lights from the DQPSK modulators 131A and 131B are intensity modulated (pulse carvered) in accordance with the clock signals, and accordingly, RZ-DQPSK modulated lights are generated. Incidentally, to the bias electrode on each of the MZ optical waveguides, a required bias voltage output from each of bias supply circuits 146A and 146B is supplied.

The RZ-DQPSK modulated lights output from the RZ modulating sections 132A and 132B are fed to a polarization beam combiner 151 to be combined in one light, so that a Pol-MUX_RZ-DQPSK signal light is generated. The Pol-MUX_RZ-DQPSK signal light is transmitted to the outside from the output port, and at the same time, a part thereof is branched by an optical branching coupler 311 as a monitor light. This monitor light is fed, herein, to a polarizer 322 via a polarization angle regulator 321 (corresponding to the first configuration example of the polarization interfering section 32 in FIG. 3), so that a polarization interfering light obtained by making orthogonal polarized channels to interfere with each other is generated. The polarization interfering light is converted into an electric signal by a light receiving element (PD) 331, and, thereafter, a direct current component thereof is eliminated by a capacitor 341, and further, an alternate current component thereof is restricted to be within a required frequency band by a filter circuit (FIL) 342. Then, the electric signal passed through the filter circuit 342 is fed to a power monitor 351 in which the power of the electric signal is measured, and a measurement result is transferred to a synchronous detecting circuit 361.

In the synchronous detecting circuit 361, a dithering component contained in an output signal from the power monitor 351 is synchronously-detected using the low frequency signal from the oscillator 363, and a detection result is transferred to a delay control circuit 362. In the delay control circuit 362, a change in output signal of the synchronous detecting circuit 361 is observed, and delay amounts in the phase shifters 211A and 211B are feedback controlled in accordance with a flowchart illustrated in FIG. 13 or the like.

According to the polarization multiplexed light transmitter in the above practical example 1-1, the inter-polarized channel delay time can be changed flexibly at a high speed, according to the system state, and therefore, it is possible to transmit in stable the Pol-MUX_RZ-DQPSK signal light by which excellent transmission characteristics are obtainable.

Next, there will be described a further practical examples corresponding to the first embodiment.

Figure 15:
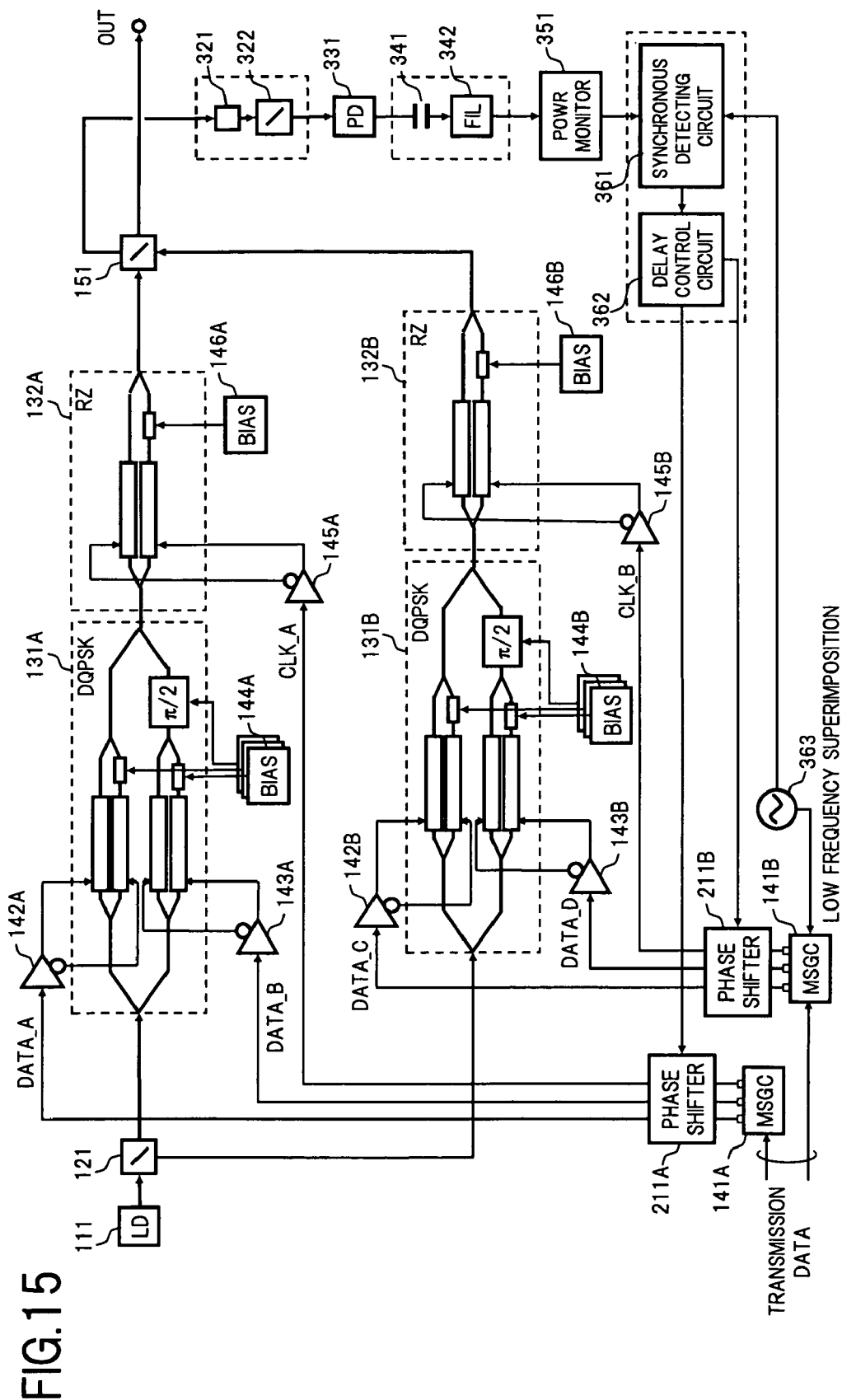
FIG. 15 is a block diagram illustrating a configuration of a practical example 1-2 corresponding to the first embodiment.

FIG. 15 is a block diagram illustrating a configuration of a practical example 1-2 of the polarization multiplexed light transmitter.

The configuration of the polarization multiplexed light transmitter illustrated in FIG. 15 differs from that of the practical example 1-1 illustrated in FIG. 14 in that the optical branching coupler 311 is omitted by utilizing a leaked light from the polarization beam combiner 151 as the monitor light.

In the polarization beam combiner 151, for example when the RZ-DQPSK modulated lights output from the RZ modulators 132A and 132B are combined using a Y-branched waveguide, since a part of the polarization multiplexed light is leaked out from the Y-branched waveguide to the substrate, it is possible to utilize the leaked light as the monitor light, by guiding the leaked light to an input port of the polarization angle regulator 321 (for example, by disposing the polarization angle regulator 321 in the vicinity of a Y-branched portion on the substrate formed with the Y-branched waveguide, by omitting the polarization angle regulator 321 to dispose the polarizer 322 of which main axis is optimized or the like). Further, for example when the RZ-DQPSK modulated lights output from the RZ modulators 132A and 132B are combined using a two-input two-output directional coupling waveguide, a light (equivalent to the leaked light) guided to an output port, which is not connected to the output port OUT of the polarization multiplexed light transmitter, in two output ports of the directional coupling waveguide, may be fed to the polarization angle regulator 321 as the monitor light.

By applying the above configuration, since the polarization beam combiner 151 comprises both functions of the polarization combining section 15 and the optical branching section 31, it becomes possible to realize the polarization multiplexed light transmitter of further miniaturized and low cost.

Next, there will be described a still further practical example corresponding to the first embodiment.

Figure 16:
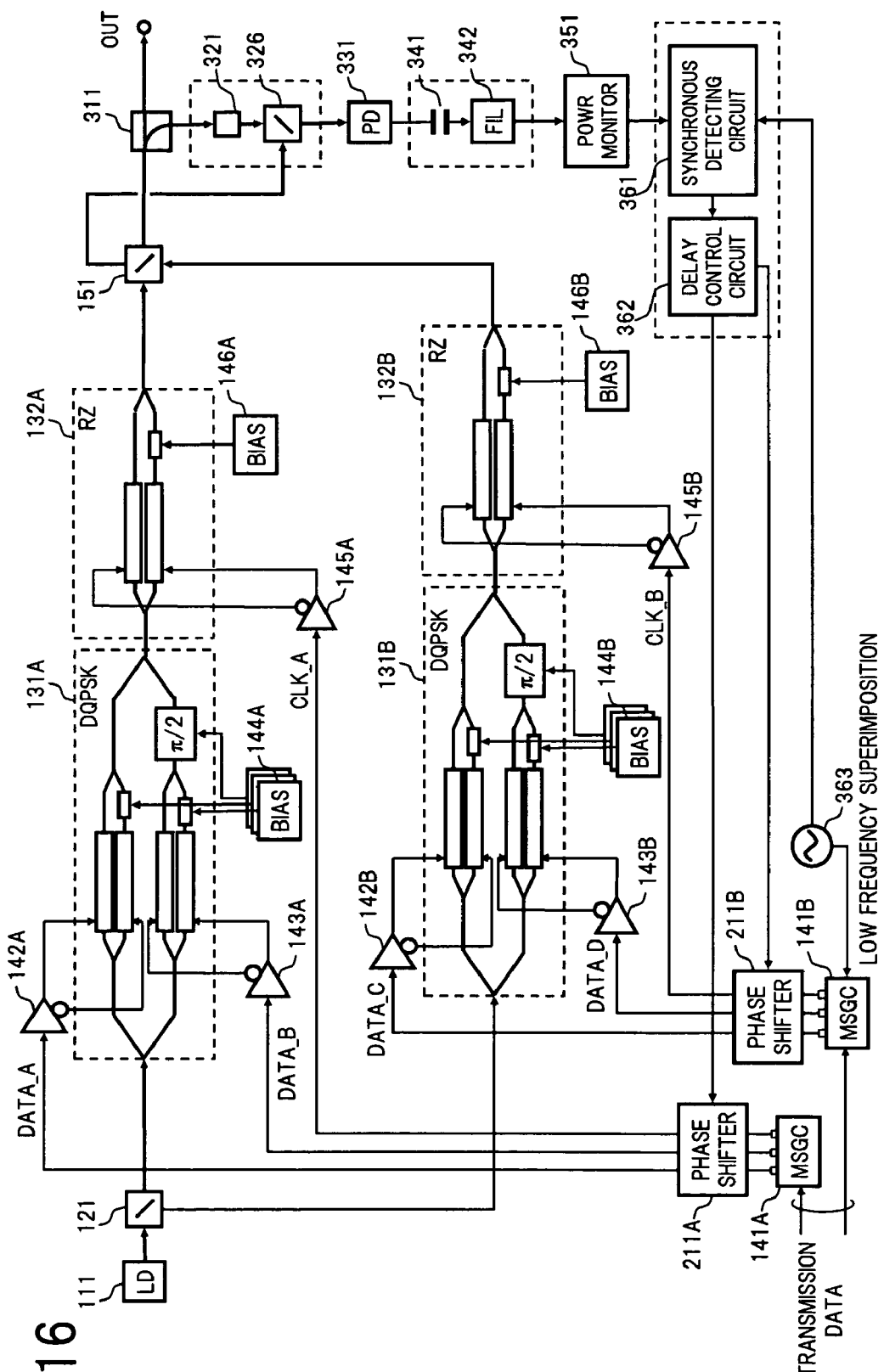
FIG. 16 is a block diagram illustrating a configuration of a practical example 1-3 corresponding to the first embodiment.

FIG. 16 is a block diagram illustrating a configuration of a practical example 1-3 of the polarization multiplexed light transmitter.

The configuration of the polarization multiplexed light transmitter illustrated in FIG. 16 differs from that of the practical example 1-1 illustrated in FIG. 14 in that a polarization combining device 326 is disposed in place of the polarizer 322 and the monitor light output from the polarization angle regulator 321 and the leaked light from the polarization beam combiner 151 are fed to the polarization combining device 326, to be combined.

In the above configuration, in the polarization angle regulator 321, a polarization angle of the monitor light branched by the optical branching coupler 311 is regulated to be rotated by 90° relative to a polarization angle of the leaked light from the polarization beam combiner 151. Then, the output light from the polarization angle regulator 321 and the leaked light from the polarization beam combiner 151 are combined by the polarization combining device 326, so that the orthogonal polarized channels interfere with each other, and consequently, the polarization interfering light is output from the polarization combining device 326 to the light receiving element 331.

By applying the above configuration, it is possible to generate further efficiently the polarization multiplexed light. Thus, it becomes possible to increase monitoring intensity in the power monitor 351. Or, since required monitoring intensity can be realized even if the band restriction in the filter circuit 342 is set to a lower side, it becomes possible to achieve the further miniaturization and low cost performance of the polarization multiplexed light transmitter.

Next, there will be described an even still further practical example corresponding to the first embodiment.

Figure 17:
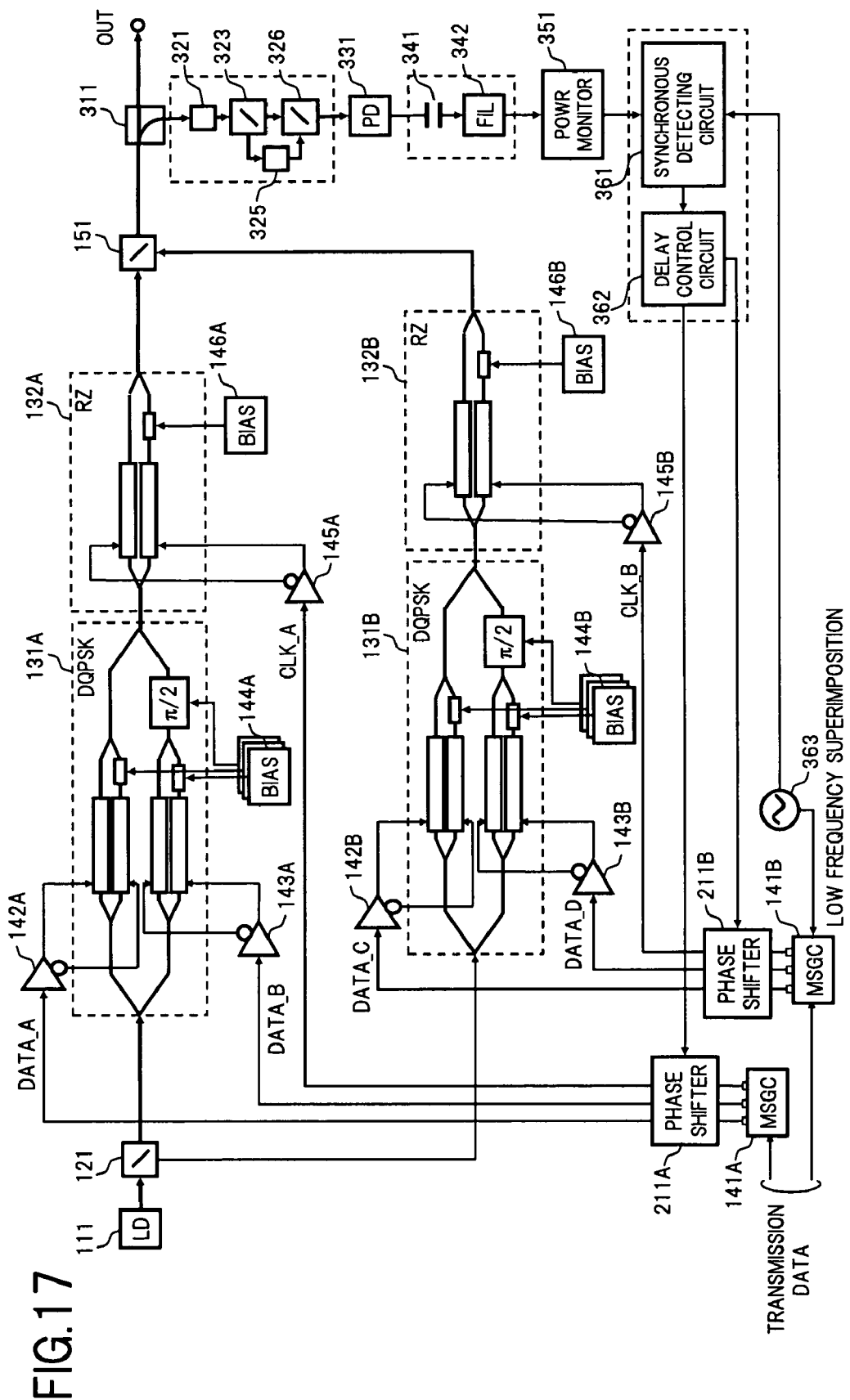
FIG. 17 is a block diagram illustrating a configuration of a practical example 1-4 corresponding to the first embodiment.

FIG. 17 is a block diagram illustrating a configuration of a practical example 1-4 of the polarization multiplexed light transmitter.

The configuration of the polarization multiplexed light transmitter illustrated in FIG. 17 differs from that of the practical example 1-1 illustrated in FIG. 14 in that the polarization separating device 323, the polarization angle regulator 325 and the polarization combining device 326 are disposed in place of the polarizer 322. The configuration of this polarization interfering section corresponds to the third configuration example of the polarization interfering section 32 illustrated in FIG. 5.

In the above configuration, in the polarization angle regulator 321, the polarization angle of the monitor light from the optical branching coupler 311 is regulated according to the main axis direction of the polarization separating device 323, so that the polarized channels "x" and "y" are separated to be output respectively from output ports of the polarization separating device 323. Then, the one polarized channel is directly fed to the polarization combining device 326, whereas the other polarized channel is fed to the polarization combining device 326 after the polarization direction thereof is rotated by 90° by the polarization angle regulator 325. As a result, the light obtained by making the polarized channels "x" and "y" to interfere with each other is generated, and the generated polarization interfering light is output to the light receiving element 331 from the polarization combining device 326. Incidentally, similarly to the configuration example illustrated in FIG. 6, the faraday rotating mirror (FRM) 327 may be disposed in place of the polarization angle regulator 325. If the FRM 327 is used, it is possible to achieve the further miniaturization of the polarization multiplexed light transmitter.

Next, there will be described a second embodiment of the polarization multiplexed light transmitter according to this invention.

Figure 18:
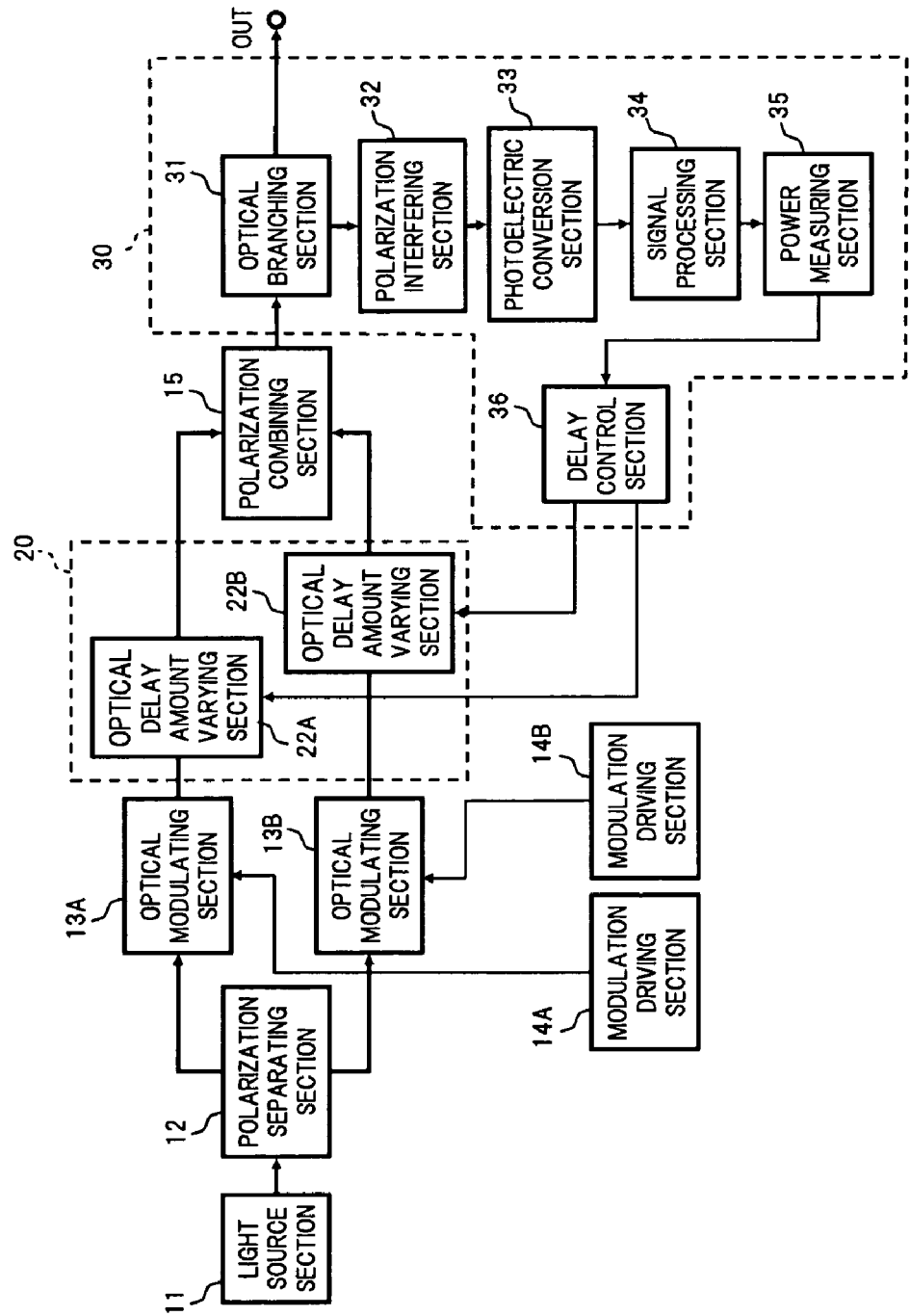
FIG. 18 is a block diagram illustrating a configuration of the polarization multiplexed light transmitter in a second embodiment.

FIG. 18 is a block diagram illustrating a configuration of the polarization multiplexed light transmitter in the second embodiment.

Contrary to the above first embodiment in which the inter-polarized channel delay time is variably controlled in an electric signal (modulation signal) stage thereof by the delay amount varying sections 21A and 21B, in the polarization multiplexed light transmitter in the present embodiment, the inter-polarized channel delay time is variably controlled in an optical signal stage thereof. To be specific, in place of the delay amount varying sections 21A and 21B used in the first embodiment, optical delay amount varying sections 22A and 22B are disposed on optical paths between the optical modulating section 13A and 13B, and the polarization combining section 15. Then, optical delay amounts in the optical delay amount varying sections 22A and 22B are feedback controlled by the delay control section 36. Incidentally, other configurations in the second embodiment except for the optical delay amount varying sections 22A and 22B are same as those in the first embodiment, and accordingly, the description thereof is omitted here.

Figure 19A:
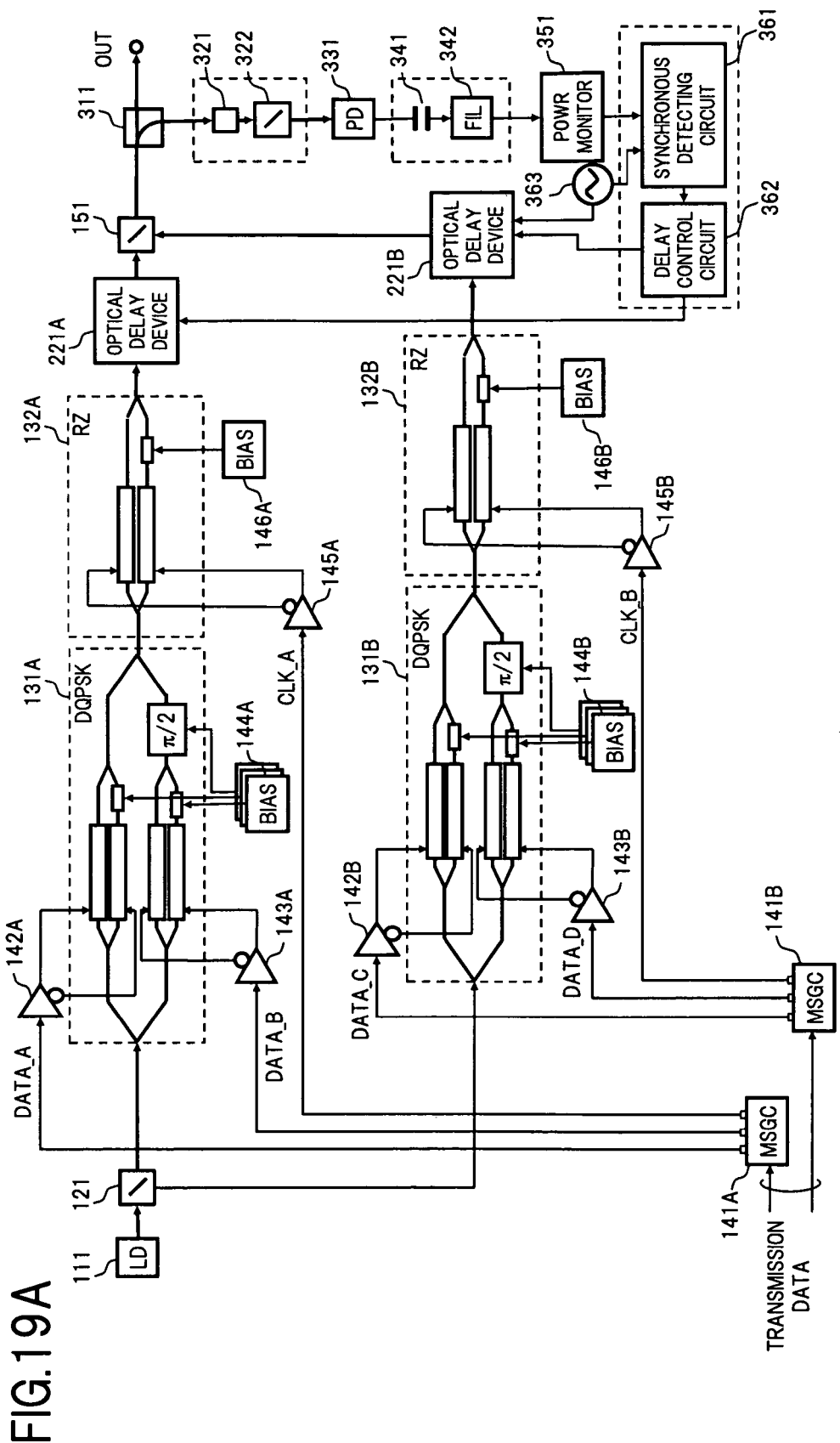
FIG. 19A is a block diagram illustrating a configuration of a practical example corresponding to the second embodiment.

FIG. 19A is a block diagram illustrating a configuration of a practical example of the polarization multiplexed light transmitter corresponding to the second embodiment. In this practical example, in place of the phase shifters 211A and 211B used in the configuration of the practical example 1-1 illustrated in FIG. 14, optical delay devices 221A and 221B are inserted on optical paths between the RZ modulator 132A and 132B, and the polarization beam combiner 151. The optical delay devices 221A and 221B are feedback controlled by the delay control circuit 362, similarly to the practical example 1-1. Incidentally, herein, in the optical delay device 221B, the low frequency signal from the oscillator 363 is superimposed on the RZ-DQPSK modulated light output from the RZ modulator 132B.

According to the second embodiment as described above and the practical example thereof, similarly to the first embodiment and the practical example 1-1, since the delay time between the orthogonal polarized channels in the polarization multiplexed light can be changed flexibly at a high speed, it is possible to effectively suppress the transmission characteristics degradation due to the change in system state.

Incidentally, as the specific practical example of the second embodiment, there has been described the configuration corresponding to the practical example 1-1. However, it is possible to apply the configurations corresponding to the practical examples 1-2 to 1-4 to the second embodiment.

Further, in the practical examples corresponding to the first and second embodiments described above, the description has been made applying the configuration provided with the RZ modulators 132A and 132B that correspond to the DQPSK modulators 131A and 131B respectively. However, as illustrated in FIG. 19B for example, it is possible to apply a configuration which provides a common RZ modulator 132 for the DQPSK modulators 131A and 131B.

In FIG. 19B, the RZ modulator 132 is arranged between the semiconductor laser 111 and the polarization beam splitter 121. And optical delay devices 221A' and 221B' are inserted on optical paths between the polarization beam splitter 121 and the DQPSK modulators 131A, 131B. In the RZ modulator 132, the continuous light output from a semiconductor laser 111 is intensity modulated according to clock signal CLK. A pulse light output from the RZ modulator 132 is split into two lights of which polarization states are mutually orthogonal by the polarization beam splitter 121, then the split lights are given to the optical delay devices 221A' and 221B' respectively. In the optical delay devices 221A' and 221B', similarly to the case illustrated in FIG. 19A, the pulse timing between the orthogonal polarized channels is variably controlled. Here, similarly to the first embodiment, the timing of each driving signal of the RZ modulator 132 and DQPSK modulators 131A, 131B is also controlled by the delay control circuit 362. Therefore, it becomes possible to simplify the configuration of the polarization multiplexed light transmitter by applying the above-mentioned configuration of FIG. 19B.

Next, there will be described a third embodiment of the polarization multiplexed light transmitter according to this invention.

In the first and second embodiment described above, the description has been made on the case of measuring the power of the alternate current component in the electric signal obtained by photo-electrically converting the polarization interfering light to judge the inter-polarized channel delay time based on the change in the measured power. However, as indicated in the calculation results illustrated in FIG. 9, it is also possible to judge the inter-polarized channel delay time based on the change in the waveform of the polarization interfering light. Therefore, in the third embodiment, there will be described an application example corresponding to the above.

Figure 20:
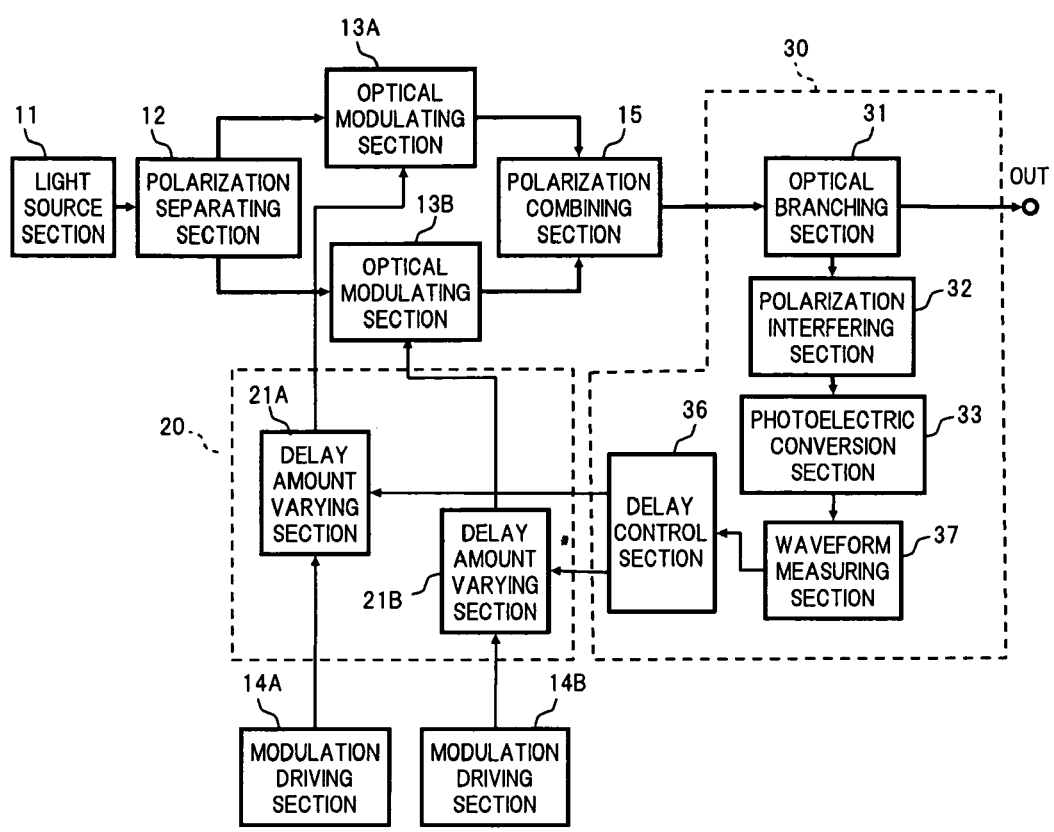
FIG. 20 is a block diagram illustrating a configuration of the polarization multiplexed light transmitter in a third embodiment.

FIG. 20 is a block diagram illustrating a configuration of the polarization multiplexed light transmitter in the third embodiment.

In FIG. 20, the polarization multiplexed light transmitter in the present embodiment, in place of the signal processing section 34 and the power measuring section 35 used in the configuration of the first embodiment illustrated in FIG. 1, a waveform measuring section 37 that measures the waveform of the electric signal output from the photoelectric conversion section 33, is disposed, to transfer a measurement result of the waveform measuring section 37 to the delay control section 36. Incidentally, other configurations in the third embodiment except for the waveform measuring section 37 are same as those in the first embodiment, and therefore, the description thereof is omitted here.

Figure 21:
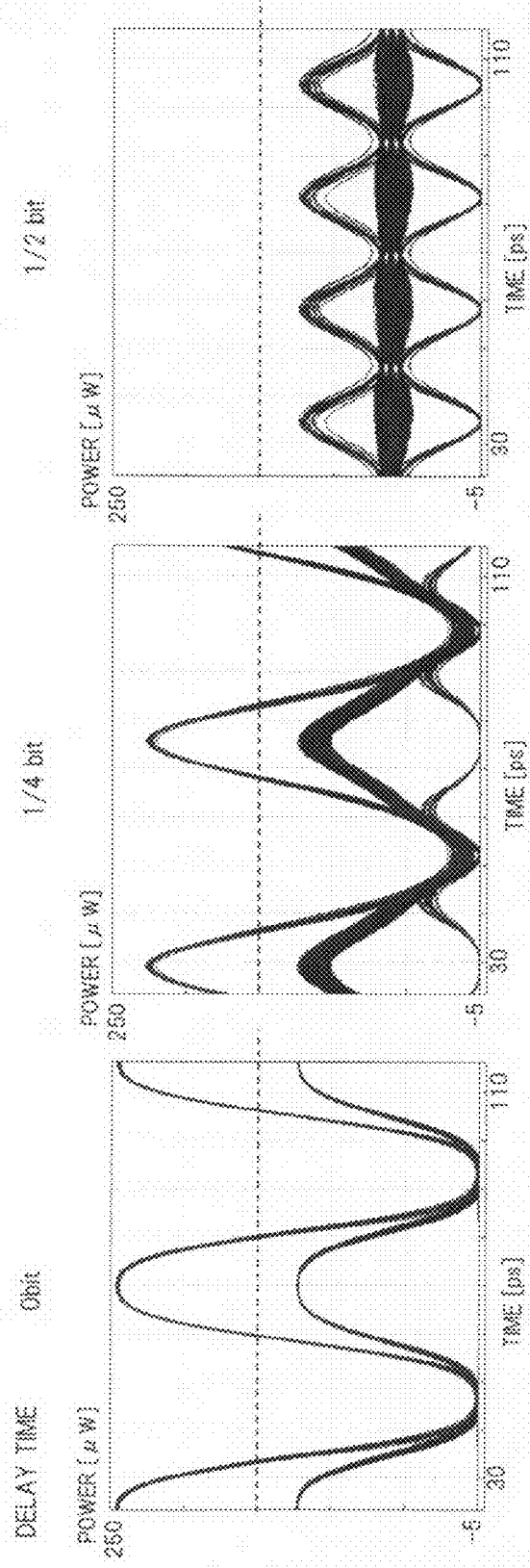
FIG. 21 is a diagram illustrating changes in waveform of the polarization interfering light according to the inter-polarized channel delay time.

In the above configuration, in the delay control section 36, the inter-polarized channel delay time is judged based on a change in the waveform measured by the waveform measuring section 37. Similarly to FIG. 8 to FIG. 10 for example, if it is assumed that the Pol-MUX_RZ-DQPSK signal light of 43 Gbps is transmitted from the polarization multiplexed light transmitter, the waveform measured by the waveform measuring section 37 is different due to the change in the inter-polarized channel delay time, as illustrated in calculation results of FIG. 21 (FIG. 21 illustrates the cases where the delay time is 0 bit time, ¼ bit time and ½ bit time). In these calculation results, for example by focusing on a change in peak amplitude of the measured waveform, it is possible to judge the inter-polarized channel delay time. Namely, the peak amplitude of the measured waveform is mostly increased when the inter-polarized channel delay time is n bit time (n is integer), whereas the peak amplitude of the measured waveform is mostly decreased when the inter-polarized channel delay time is $(2n+1)/2$ bit time.

Accordingly, when the inter-polarized channel delay time is set to be bit-interleaved, the delay control section 36 may feedback control the delay amount varying sections 21A and 21B so that the peak amplitude of the measured waveform becomes minimal. Further, when the inter-polarized channel delay time is set to be bit-aligned, the delay control section 36 may feedback control the delay amount varying sections 21A and 21B so that the peak amplitude of the measured waveform becomes maximal. Furthermore, similarly to the first embodiment, it is also possible to set the inter-polarized channel delay time to be in between the bit-interleave and the bit-align.

Figure 22:
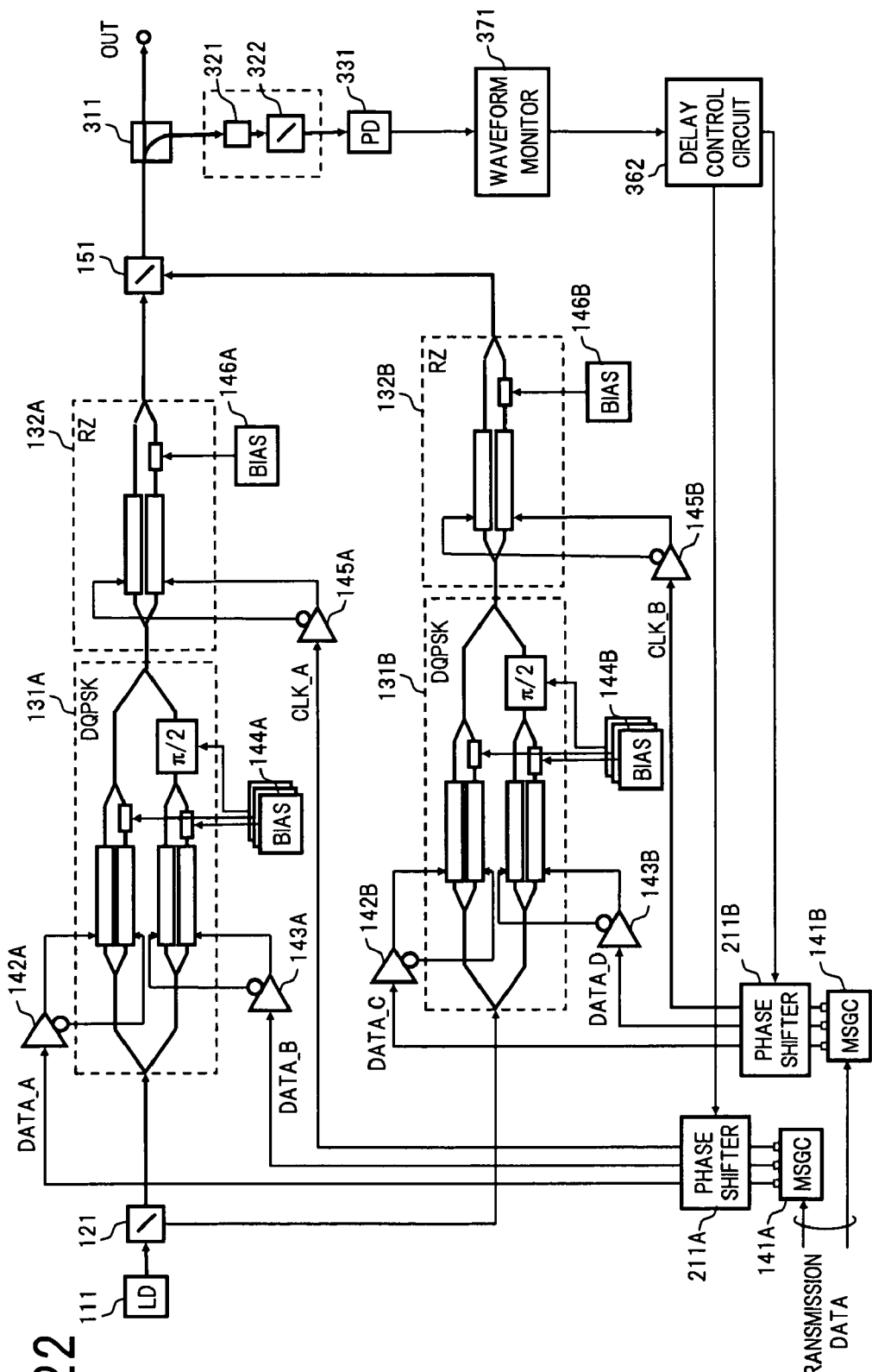
FIG. 22 is a block diagram illustrating a configuration of a practical example corresponding to the third embodiment.

FIG. 22 is a block diagram of a configuration of a practical example of the polarization multiplexed light transmitter corresponding to the third embodiment. In this practical example, in place of the capacitor 341, the filter circuit 342 and the power monitor 351 used in the configuration of the practical example 1-1 illustrated in FIG. 14 for example, a waveform monitor 371 is disposed, so that the waveform of the electric signal output from the light receiving element 331 is monitored by the waveform monitor 371 and the monitored waveform is transferred to the delay control circuit 362. Incidentally, it is possible to omit the oscillator 363 for superimposing the low frequency signal on the modulation signal and the synchronous detecting circuit 362, in the case where the waveform of the electric circuit is monitored.

According to the third embodiment as described above and the practical example thereof, similarly to the first embodiment and the practical example 1-1, it is possible to effectively suppress the transmission characteristics degradation of the polarization multiplexed light due to the change in system state, by monitoring the waveform of the electric signal obtained by photo-electrically converting the polarization interfering light to control the inter-polarized channel delay time based on the change in the monitored waveform.

Incidentally, as the specific practical example of the third embodiment, there has been described the configuration corresponding to the practical example 1-1. However, the configurations corresponding to the practical examples 1-2 to 1-4 are applicable to the third embodiment. Further, similarly to the second embodiment, the inter-polarized channel delay time may be variably controlled in the optical signal stage thereof.

Next, there will be described a fourth embodiment of the polarization multiplexed light transmitter according to this invention.

In the first and second embodiments described above, the direct current component in the electric signal obtained by photo-electrically converting the polarization interfering light, is eliminated by the signal processing section 34, and the inter-polarized channel delay time is judged based on the change in the power of the alternate current component of which frequency band is restricted as needed. However, it is also possible to extract a frequency component at the baud rate or at n times the baud rate in the electric signal obtained by photo-electrically converting the polarization interfering signal, to thereby judge the inter-polarized channel delay time based on a change in the power of the frequency component. Therefore, in the fourth embodiment, there will be described an application example corresponding to the above.

Figure 23:
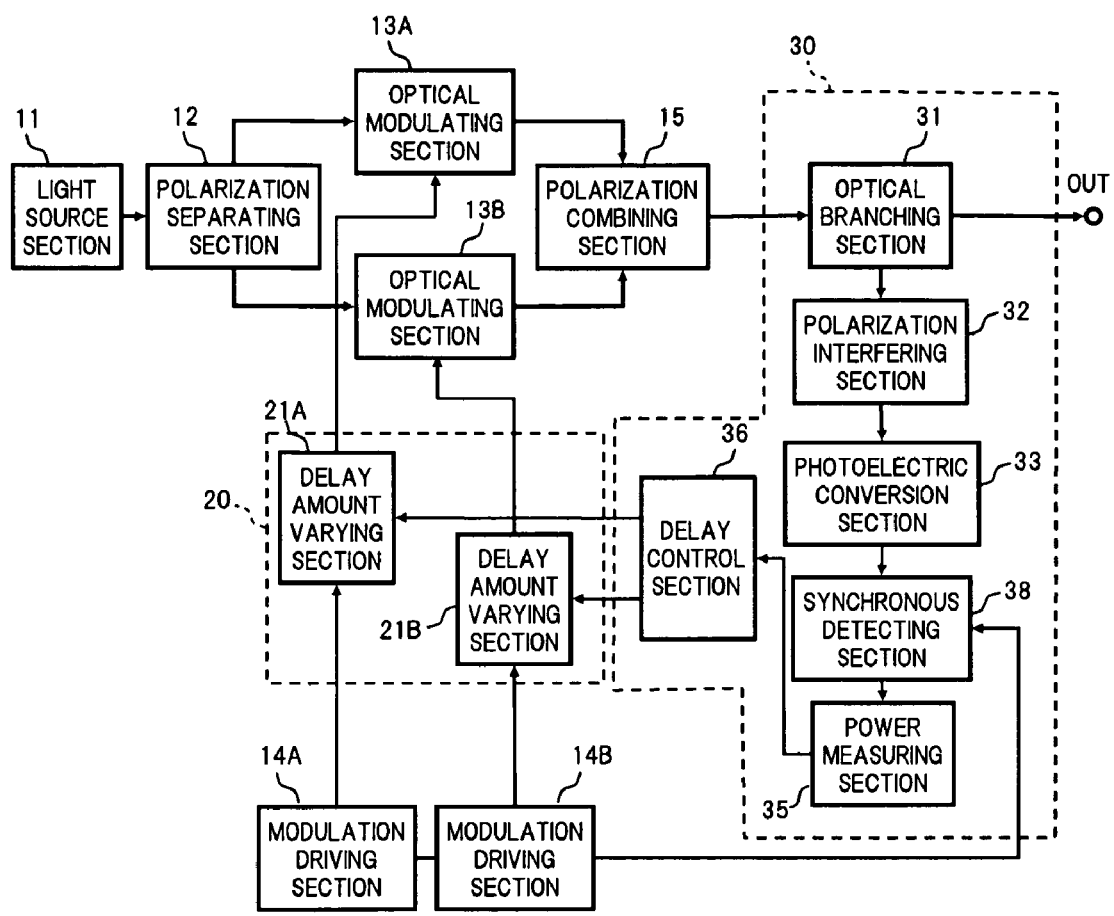
FIG. 23 is a block diagram illustrating a configuration of the polarization multiplexed light transmitter in a fourth embodiment.

FIG. 23 is a block diagram illustrating a configuration of the polarization multiplexed light transmitter in the fourth embodiment.

In FIG. 23, in the polarization multiplexed light transmitter in the fourth embodiment, in place of the signal processing section 34 used in the configuration of the first embodiment illustrated in FIG. 1, a synchronous detecting section 38 that extracts the frequency component at the baud rate (or the frequency component at n times the baud rate) from the electric signal output from the photoelectric conversion section 33, is disposed, so that the power of the frequency component extracted by the synchronous detecting section 38 is measured by the power measuring section 35 and a measurement result is transferred to the delay control section 36. Incidentally, other configurations in the fourth embodiment except for the synchronous detecting section 38 are same as those in the first embodiment, and accordingly, the description thereof is omitted here.

The synchronous detecting section 38 is fed with a signal having a frequency corresponding to the baud rate (or n times the baud rate) of the modulation signal generated by each of the modulation driving sections 14A and 14B, and using this signal, synchronously detects the electric signal from the photoelectric conversion section 33 to extract the frequency component corresponding to the baud rate (or n times of the baud rate). Incidentally, although not illustrated in the figure, a narrow band-pass filter which includes the frequency corresponding the baud rate (or n times the baud rate) within a pass-band thereof, may be inserted between the photoelectric conversion section 33 and the synchronous detecting section 38 or may be disposed in place of the photoelectric conversion section 33.

Figure 24:
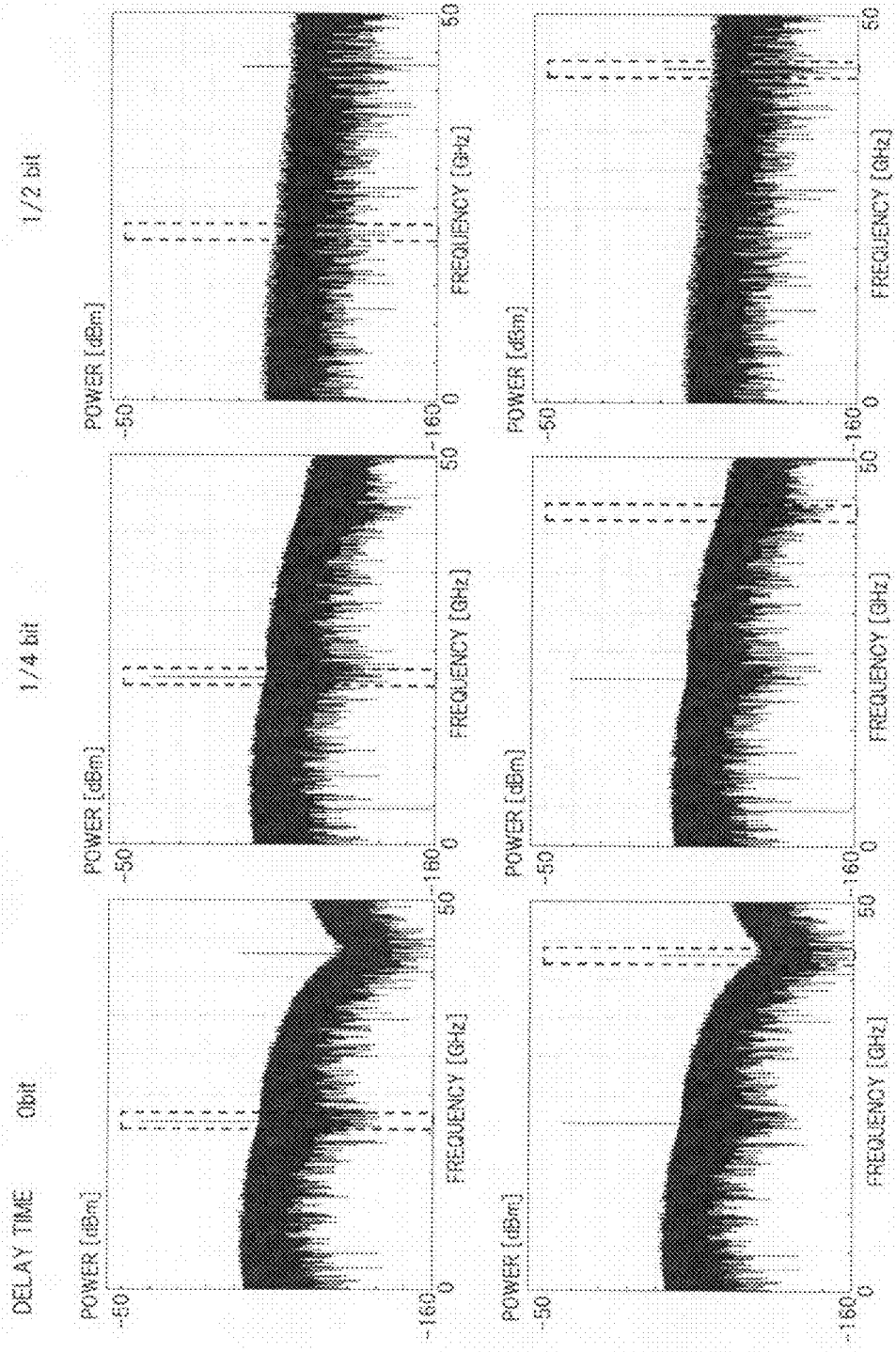
FIG. 24 is a diagram illustrating changes in power of a frequency component extracted by a synchronous detecting section according to the inter-polarized channel delay time.

In the above configuration, in the delay control section 36, the inter-polarized channel delay time is judged based on the change in the power measured by the power measuring section 35. Similarly to FIG. 8 to FIG. 10 for example, if it is assumed that the Pol-MUX_RZ-DQPSK signal light of 43 Gbps is transmitted from the polarization multiplexed light transmitter, the frequency component surrounded by each broken line in calculation results illustrated in FIG. 24 (an upper stage of FIG. 24 is the frequency component corresponding to the baud rate, and a lower stage of FIG. 24 is the frequency component corresponding to n times baud rate) is extracted by the synchronous detecting section 38. When the inter-polarized channel delay time is changed (FIG. 24 illustrates the cases where the delay time is 0 bit time, ¼ bit time and ½ bit time), the power of the frequency component is increased/decreased. Incidentally, the power measured by the power measuring section 35 is the power obtained by combining a linear spectrum component at the baud rate (or n times the baud rate) with the frequency component in the vicinity thereof.

In the calculation results of FIG. 24, in the case where the frequency component corresponding to the baud rate is extracted, the power measured by the power measuring section 35 is mostly increased when the inter-polarized channel delay time is 0 bit time, while being mostly decreased when the inter-polarized channel delay time is ½ bit time. Further, in the case where the frequency component corresponding to two times the baud rate is extracted, the power measured by the power measuring section 35 is mostly decreased when the inter-polarized channel delay time is 0 bit time, while being mostly increased when the inter-polarized channel delay time is ½ bit time. Incidentally, focusing on only the linear spectrum component of two times the baud rate, there is a feature in that the linear spectrum component is lost when the inter-polarized channel delay time is ¼ bit time.

Accordingly, in the case where the frequency component corresponding to the baud rate is extracted, when the inter-polarized channel delay time is set to be bit-interleaved, the delay control section 36 may feedback control the delay amount varying sections 21A and 21B so that the measured power of the power measuring section 25 becomes minimal, whereas when the inter-polarized channel delay time is set to be bit-aligned, the delay control section 36 may feedback control the delay amount varying sections 21A and 21B so that the measured power of the power measuring section 25 becomes maximal. On the other hand, in the case where the frequency component corresponding to two times the baud rate is extracted, the delay control section 36 may feedback control the delay amount varying sections 21A and 21B in accordance with relations adverse to the above. Further, if the delay amount varying sections 21A and 21B are feedback controlled so that the linear spectrum component of two times the baud rate is lost, it becomes also possible to set the inter-polarized channel delay time to ¼ bit time (an intermediate state between the bit interleave and the bit align).

Figure 25:
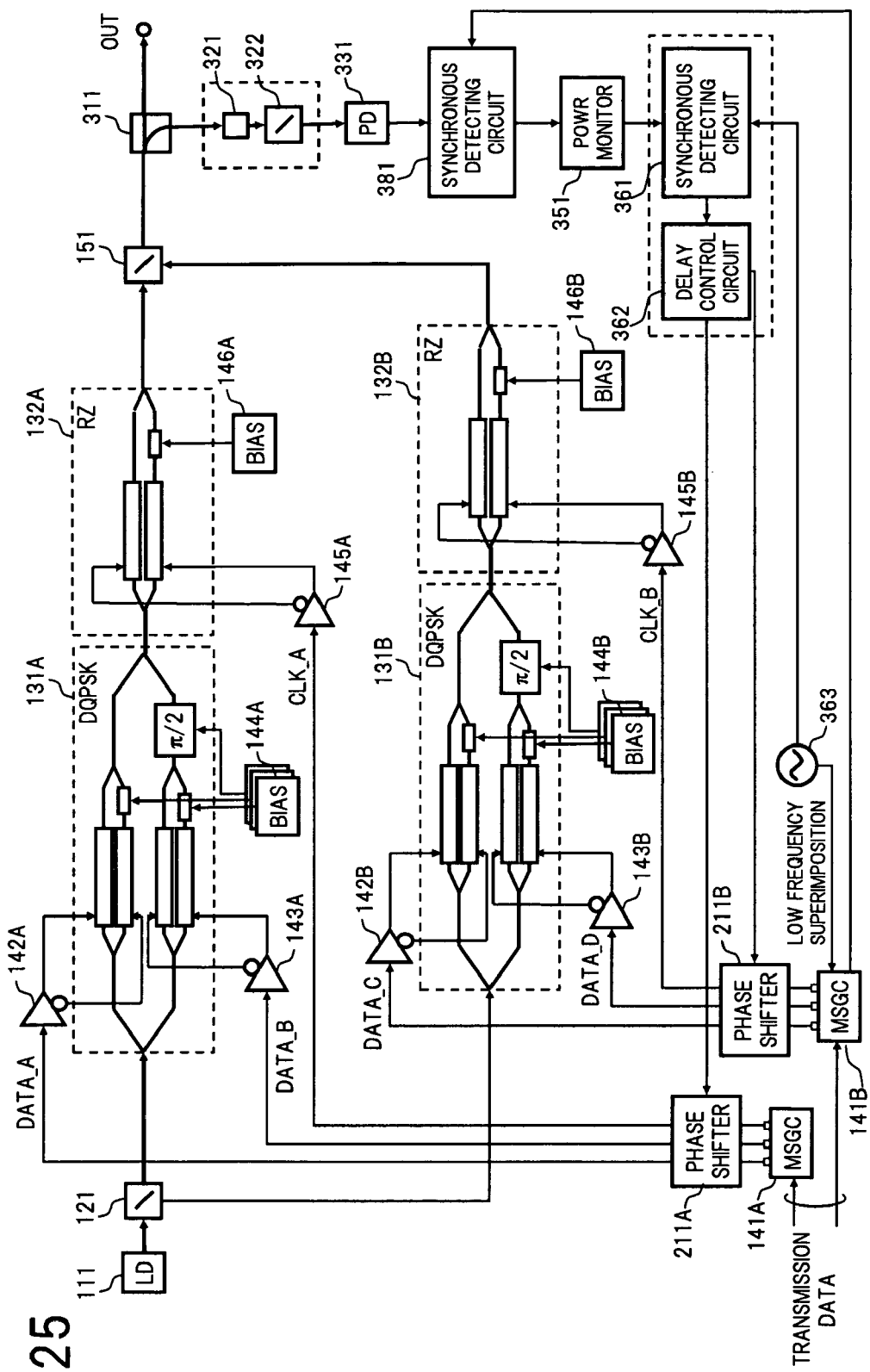
FIG. 25 is a block diagram illustrating a configuration of a practical example corresponding to the fourth embodiment.

FIG. 25 is a block diagram illustrating a configuration of a practical example of the polarization multiplexed light transmitter corresponding to the fourth embodiment. In this practical example, in place of the capacitor 341 and the filter circuit 342 used in the configuration of the practical example 1-1 illustrated in FIG. 14 for example, a synchronous detecting circuit 381 is disposed, and in the synchronous detecting circuit 381, the frequency component corresponding to the baud rate (or n times the baud rate) is extracted from the electric signal output from the light receiving element 331, and further, the power of the frequency component is monitored by the power monitor 351.

According to the fourth embodiment described above and the practical example thereof, similarly to the first embodiment and the practical example 1-1, it is possible to effectively suppress the transmission characteristics degradation of the polarization multiplexed light due to the change in system state, by extracting the frequency component corresponding to the baud rate (or n times the baud rate) from the electric signal obtained by photo-electrically converting the polarization interfering light to control the inter-polarized channel delay time based on the change in the monitored power of the frequency component.

Incidentally, as the specific practical example of the fourth embodiment, there has been described the configuration corresponding to the practical example 1-1. However, it is also possible to apply the configurations corresponding to the practical examples 1-2 to 1-4 to the fourth embodiment. Further, similarly to the second embodiment, the pulse timing between the polarized channels may be variably controlled in an optical signal stage thereof.

Next, there will be described a fifth embodiment of the polarization multiplexed light transmitter according to this invention.

In each of the embodiments described above, in order to make the orthogonal polarized channels in the monitor light branched by the optical branching section 31 to interfere with each other, it is necessary to administrate the polarization state of the monitor light using the polarization angle regulator or the like. However, if such administration of the polarization state is to be performed with high precision, it becomes necessary to perform the regulation of high quality or the like, but the realization thereof may not be readily achieved. Therefore, in the fifth embodiment, there will be described an application example corresponding to the above.

Figure 26:
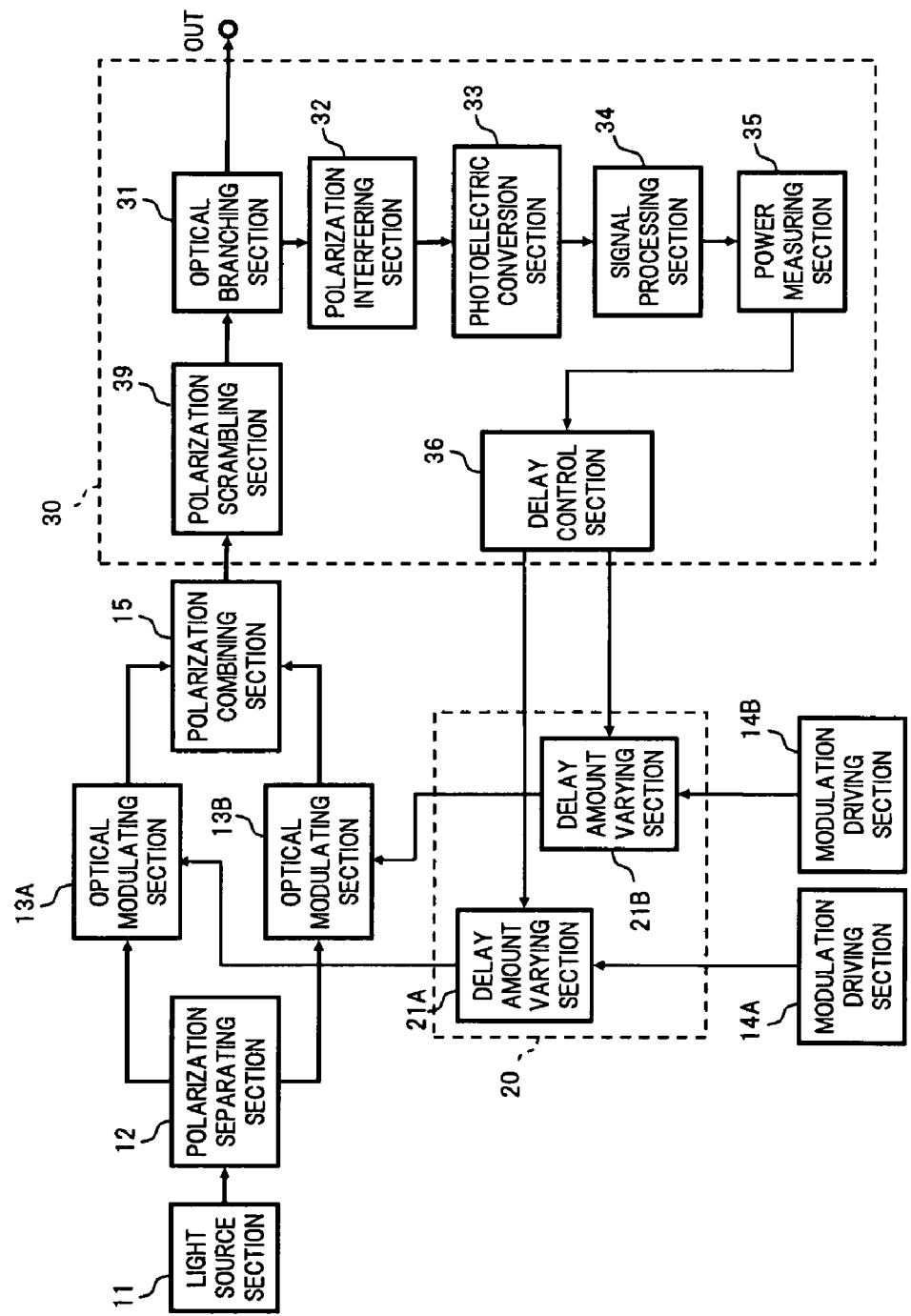
FIG. 26 is a block diagram illustrating a configuration of the polarization multiplexed light transmitter in a fifth embodiment.

FIG. 26 is a block diagram illustrating a configuration of the polarization multiplexed light transmitter in the fifth embodiment.

In FIG. 26, in the polarization multiplexed light transmitter in the present embodiment, for the configuration of the first embodiment in FIG. 1, a polarization scrambling section 39 is disposed on an optical path between the polarization combining section 15 and the optical branching section 31, and the polarization state of the polarization multiplexed light combined by the polarization combining section 15 fluctuates randomly by the polarization scrambling section 39. Incidentally, other configurations in the fifth embodiment except for the polarization scrambling section 39 are same as those in the first embodiment, and accordingly, the description thereof is omitted here.

Figure 27:
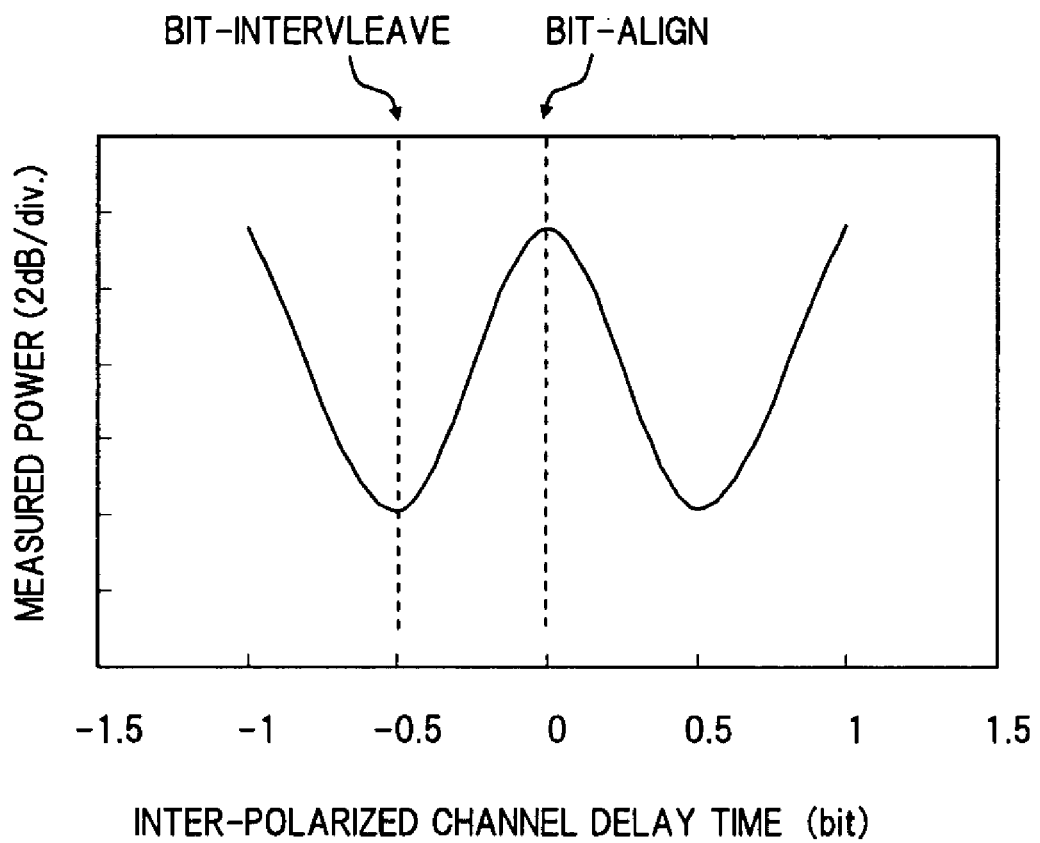
FIG. 27 is a graph illustrating a relation of the measured power to the inter-polarized channel delay time for when the LPF of which 3 dB bandwidth is 300 MHz is applied.

In the above configuration, the monitor light of which polarization state fluctuates randomly is fed to the power measuring section 35 via the polarization interfering section 32, the photoelectric conversion section 33 and the signal processing section 34, and the power of the alternate current component in the electric signal obtained by photo-electrically converting the polarization interfering light is measured by the power measuring section 35, and further, the inter-polarized channel delay time is judged based on the change in the measured power. Similarly to FIG. 8 to FIG. 10 for example, if it is assumed that the Pol-MUX_RZ-DQPSK signal light is transmitted from the polarization multiplexed light transmitter, when the frequency band of the alternate current component is restricted to the low band by using the low-pass filter of which 3 dB bandwidth is 300 MHz, the power measured by the power measuring section 35 indicates dependence, as illustrated in FIG. 27, on the inter-polarized channel delay time.

Accordingly, the delay control section 36 may feedback control the delay amount varying sections 21A and 21B so that the measured power becomes minimal, when the inter-polarized channel delay time is set to be bit-interleaved. Further, the delay control section 36 may feedback control the delay amount varying sections 21A and 21B so that the measured power becomes maximal, when the inter-polarized channel delay time is set to be bit-aligned.

According to the polarization multiplexed light transmitter in the fifth embodiment described above, the polarization state of the polarization multiplexed light is varied randomly by the polarization scrambling section 39. Therefore, since the polarization state of the monitor light does not need to be administrated when the orthogonal polarization channels in the monitor light are made to interfere with each other, it becomes possible to readily realize a monitoring system.

Figure 28:
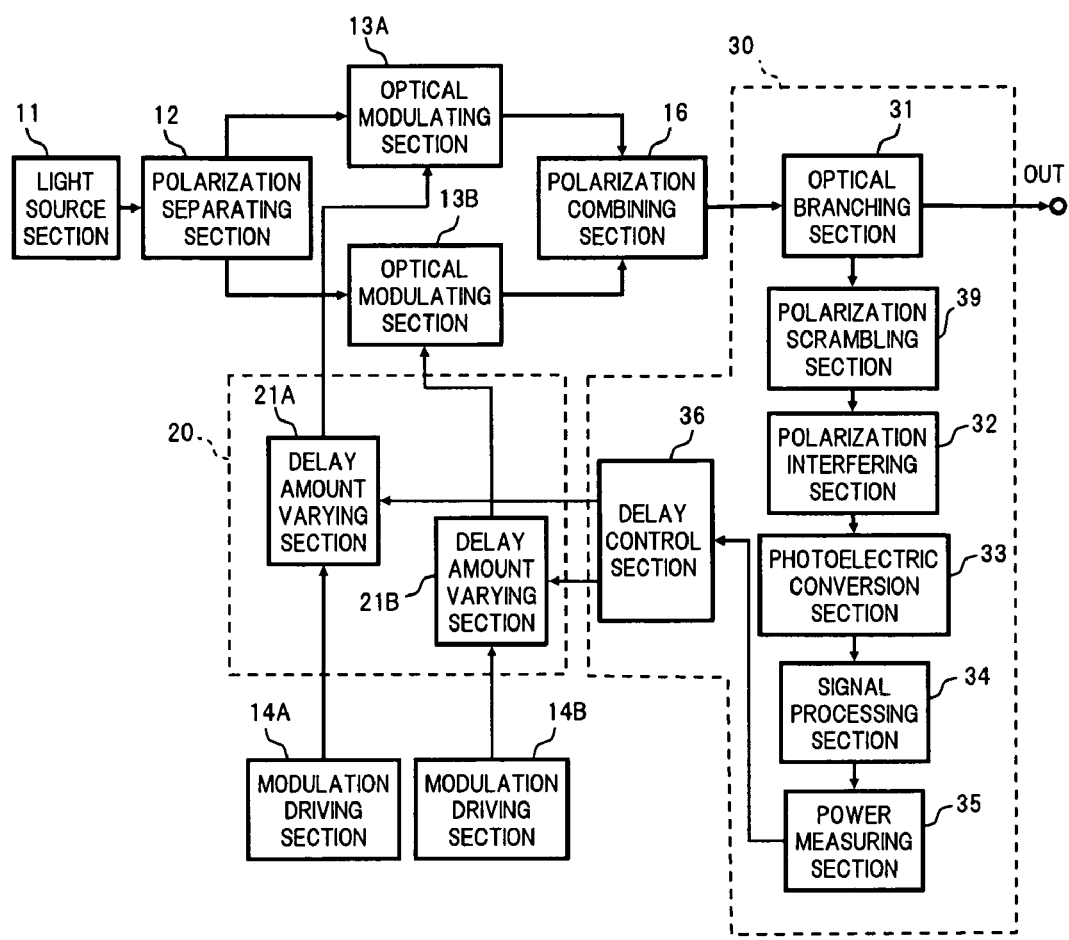
FIG. 28 is a block diagram illustrating another configuration relating to the fifth embodiment.

Incidentally, in the fifth embodiment, one example has been described in which the polarization scrambling section 39 is arranged between the polarization combining section 15 and the optical branching section 31. However, as illustrated in FIG. 28 for example, it is possible to obtain a similar functional effect by disposing the polarization scrambling section 39 on an optical path between the branching port of the optical branching section 31 and the polarization interfering section 32. Further, one example has been described in which the polarization scrambling section 39 is disposed to the configuration of the first embodiment. However, it is also possible to apply the polarization scrambling section 39 to the configurations of the second to fourth embodiment.

Figure 29:
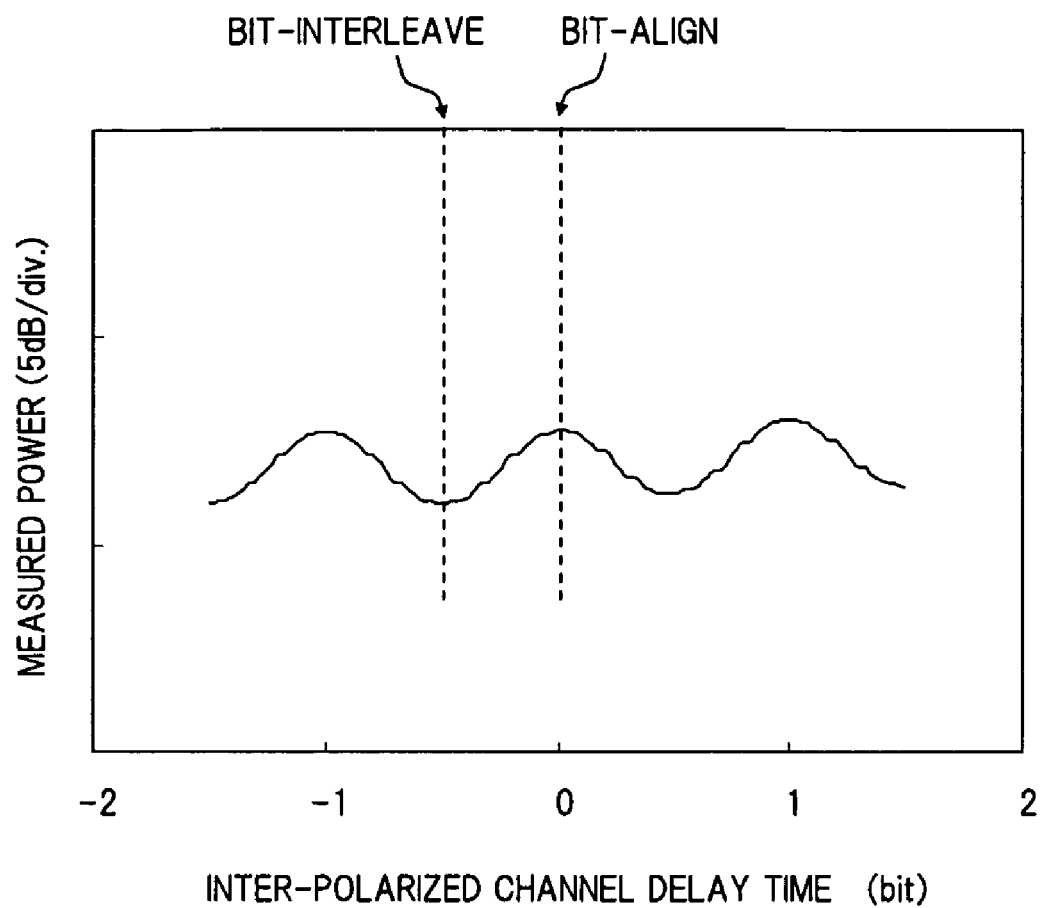
FIG. 29 is a graph illustrating a relation of the measured power to the inter-polarized channel delay time in a NRZ-DQPSK modulation format.
Figure 30:
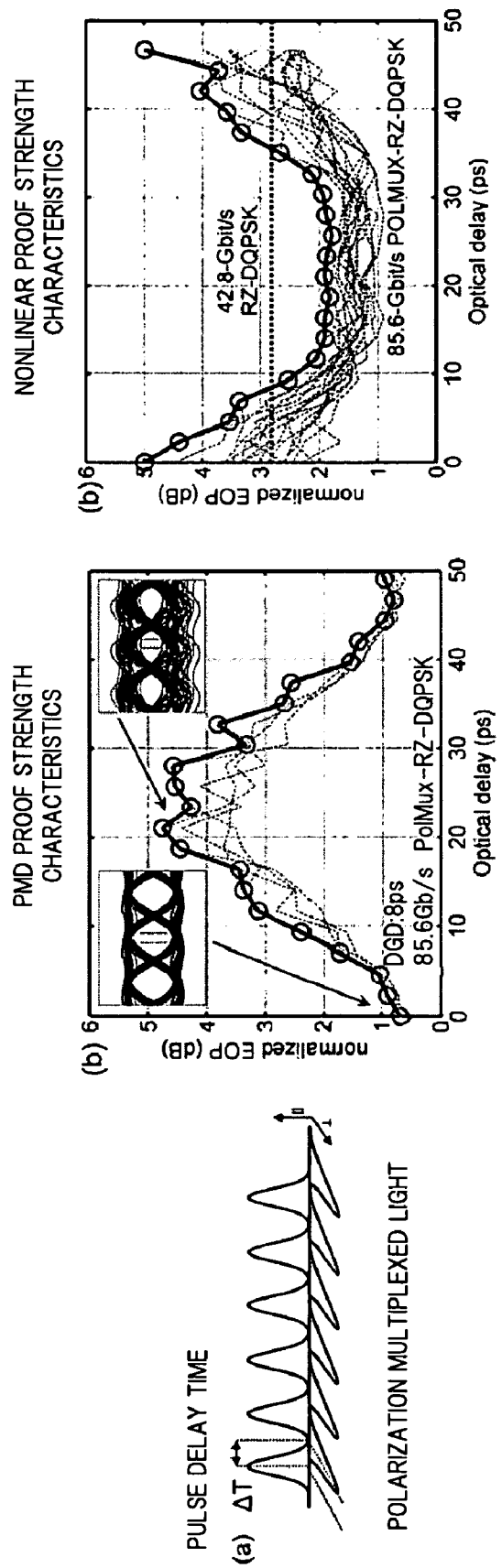
FIG. 30 is a diagram for explaining transmission quality degradation of a polarization multiplexed light.

Further, in the respective embodiments described above and the practical examples corresponding to the respective embodiments, the description has been made using the calculation results of the Pol-MUX_RZ-DQPSK signal light. However, the modulation format for the polarization multiplexed light in this invention is not limited to the above example. For example, similarly to the first embodiment, in the case where the power of the alternate current component in the electric signal obtained by photo-electrically converting the polarization interfering light is measured for a signal light obtained by polarization multiplexing a NRZ-DQPSK modulated light of which pulsed format is different from that of the RZ-DQPSK modulated light, it can be verified that the change in the measured power indicates dependence, as illustrated in calculation results of FIG. 29, on the inter-polarized channel delay time. Comparing the calculation results in FIG. 29 with the calculation results in FIG. 12 for the RZ-DQPSK modulation format, the NRZ-DQPSK modulation format has dependence basically same as that of the RZ-DQPSK modulation format although the control sensitivity thereof is inferior to that of the RZ-DQPSK modulation format, and accordingly, it is understood that the inter-polarized channel delay time can be judged based on the change in the measured power.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A polarization multiplexed light transmitter which transmits a polarization multiplexed light containing a first optical signal and a second optical signal of which polarization states are mutually orthogonal, comprising:

a delay regulating unit configured to regulate relative delay times of the first and second optical signals;

a delay control unit configured to make orthogonal polarization components contained in a monitor light obtained by taking out a part of the polarization multiplexed light to interfere with each other, to generate a polarization interfering light, and configured to judge a delay time between the first and second optical signals based on a change in a state of an electric signal obtained by photo-electrically converting the polarization interfering light, and configured to control a regulation amount in the delay regulating unit so that the judged delay time reaches a predetermined value;

a polarization separating section that separates an output light from a light source section into two lights having polarization states which are mutually orthogonal;

a first optical modulating section that modulates one of the lights separated by the polarization separating section to generate the first optical signal;

a first modulation driving section that generates a first modulation signal for driving the first optical modulating section;

a second optical modulating section that modulates the other light separated by the polarization separating section to generate the second optical signal;

a second modulation driving section that generates a second modulation signal for driving the second optical modulating section; and a polarization combining section that combines the first and second optical signals generated by the first and second optical modulating section into one light, wherein the delay regulating unit makes relative delay times of the first and second modulation signals output from the first and second modulation driving sections to be variable, and the delay control unit comprises:
an optical branching section that branches the part of the polarization multiplexed light as the monitor light;

a polarization interfering section that includes a polarization separating device, and the monitor light branched by the optical branching section is fed to the polarization separating device in a state where polarization directions of the orthogonal polarization components contained in the monitor light are deviated from a direction of a main axis of the polarization separating device, to thereby generate the polarization interfering light;

a photoelectric conversion section that converts the polarization interfering light generated by the polarization interfering section into the electric signal;

a signal processing section that eliminates at least a direct current component from the electrical signal converted by the photoelectric conversion section;

a power measuring section that measures the power of the electric signal passed through the signal processing section; and a delay control section that judges the delay time between the first and second optical signals based on a change in the power measured by the power measuring section, to control the regulation amount in the delay regulating unit so that the judged delay time reaches the predetermined value.

2. A polarization multiplexed light transmitter according to claim 1, wherein the signal processing section restricts a frequency band of an alternate current component in the electric signal converted by the photoelectric conversion section.

3. A polarization multiplexed light transmitter according to claim 2, wherein the signal processing section restricts the frequency band of the alternate current component in the electric signal converted by the photoelectric conversion section, to a lower side of frequencies corresponding to baud rates of the first and second optical signals.

4. A polarization multiplexed light transmitter according to claim 2, wherein the signal processing section extracts a frequency component corresponding to the baud rates of the first and second optical signals or a frequency component corresponding to the integral multiple of the baud rates of the first and second optical signals, from the electric signal converted by the photoelectric conversion section.

5. A polarization multiplexed light transmitter according to claim 1, wherein in the polarization interfering section, a deviation angle of one of the polarization directions of the orthogonal polarization components contained in the monitor light relative to the direction of the main axis of the polarization separating device is 45°±360°×N (N is integer).

6. A polarization multiplexed light transmitter according to claim 1, further comprising;

a polarization combining section that combines the first and second optical signals into one light, wherein the optical branching section guides a leaked light from the polarization combining section to the polarization interfering section as a monitor light.

7. A control method of a polarization multiplexed light transmitter which transmits a polarization multiplexed light containing a first optical signal and a second optical signal of which polarization states are mutually orthogonal, the control method comprising:

taking out a part of the polarized multiplexed light;

branching the part of the polarization multiplexed light as the monitor light;

feeding the branched monitor light to a polarization separating device in a state where polarization directions of orthogonal polarization components contained in the branched monitor light are deviated from a direction of a main axis of the polarization separating device, to thereby generate a polarization interfering light;

judging a delay time between the first and second optical signals based on a change in a state of an electric signal obtained by photo-electrically converting the generated polarization interfering light;

controlling relative delay times of the first and second optical signals so that the judged delay time reaches a predetermined value;

separating an output light from a light source section into two lights having polarization states which are mutually orthogonal;

modulating one of the lights separated to generate the first optical signal;

generating a first modulation signal for driving the modulating to generate the first optical signal;

modulating the other light separated to generate the second optical signal;

generating a second modulation signal for driving the modulating to generate the second optical signal; and combining the first and second optical signals generated by the modulating of the lights separated into one light, making relative delay times of the first and second modulation signals to be variable.

* * * * *

UNITED STATES PATENT AND TRADEMARK OFFICE
CERTIFICATE OF CORRECTION

PATENT NO. : 8,412,047 B2
APPLICATION NO. : 12/585156
DATED : April 2, 2013
INVENTOR(S) : Toshiki Tanaka et al.

It is certified that error appears in the above-identified patent and that said Letters Patent is hereby corrected as shown below:

In the Claims

Column 24, Line 5, In Claim 5, delete "45°±360°" and insert -- 45°+360° --, therefor.

Signed and Sealed this
Sixteenth Day of July, 2013

Teresa Stanek Rea
*Acting Director of the United States Patent and Trademark Office*